(12) United States Patent
Gumaste

(10) Patent No.: US 8,792,506 B2
(45) Date of Patent: Jul. 29, 2014

(54) INTER-DOMAIN ROUTING IN AN N-ARY-TREE AND SOURCE-ROUTING BASED COMMUNICATION FRAMEWORK

(75) Inventor: Ashwin Gumaste, Mumbai (IN)

(73) Assignee: Indian Institute of Technology Bombay, Mumbai (IN)

( * ) Notice: Subject to any disclaimer, the term of this patent is extended or adjusted under 35 U.S.C. 154(b) by 114 days.

(21) Appl. No.: 13/245,870

(22) Filed: Sep. 27, 2011

(65) Prior Publication Data

US 2012/0106560 A1 May 3, 2012

(30) Foreign Application Priority Data

Jul. 19, 2011 (IN) .......................... 2050/MUM/2011

(51) Int. Cl.
*H04L 12/56* (2006.01)
*H04L 12/54* (2013.01)

(52) U.S. Cl.
CPC ..................................... *H04L 12/56* (2013.01)
USPC .......................................................... 370/401

(58) Field of Classification Search
None
See application file for complete search history.

(56) References Cited

U.S. PATENT DOCUMENTS

2008/0291862 A1\* 11/2008 Lu .................................. 370/312
2009/0310610 A1\* 12/2009 Sandstrom ..................... 370/392

FOREIGN PATENT DOCUMENTS

GB   PCT/GB2008/000954   \*   9/2008

\* cited by examiner

*Primary Examiner* — Huy D Vu
*Assistant Examiner* — Bao G Nguyen

(57) ABSTRACT

Systems and techniques for processing and forwarding packets are described. Specifically, some embodiments can include a receiving mechanism, a determining mechanism, a generating mechanism, and a sending mechanism. The receiving mechanism can be configured to receive a first packet that is to be routed from a first node in a first Autonomous System (AS) to a second node in a second AS. The determining mechanism can be configured to determine a set of bits that encodes a route in an n-ary tree that includes the first node and a root node in the first AS. The generating mechanism can be configured to generate, based on the first packet, a second packet that includes the set of bits and an identifier associated with the second AS. The sending mechanism can be configured to send the second packet.

12 Claims, 11 Drawing Sheets

INTER-DOMAIN ROUTING IN AN N-ARY-TREE AND SOURCE-ROUTING BASED COMMUNICATION FRAMEWORK

RELATED APPLICATION

This application claims priority to Indian Patent Application No. 2050/MUM/2011, entitled "Method and Apparatus for End-End Communication and Interdomain Routing in Omnipresent Ethernet Networks with an Option to Migrate to MPLS-TP," by inventor Ashwin Gumaste, filed 19 Jul. 2011, the contents of which are incorporated by reference herein.

BACKGROUND

1. Technical Field

This disclosure relates to computer networking. More specifically, this disclosure relates to inter-domain routing in an n-ary-tree and source-routing based communication framework.

2. Related Art

The insatiable demand for bandwidth and the ever increasing size and complexity of computer networks has created a strong need for switches and/or routers that are capable of performing switching and/or routing functions with low latencies.

It is generally desirable to decrease the switching and/or routing latency, cost, and power consumption of switches and/or routers. Some approaches decrease switching and/or routing latency by increasing the complexity and/or the speed at which the circuits operate. Unfortunately, these approaches increase the cost and the power consumption of the switches and/or routers.

SUMMARY

Some embodiments described in this disclosure provide methods and apparatuses for processing and forwarding packets. Specifically, some embodiments provide a switch-router that can include one or more of: (1) a receiving mechanism configured to receive a first packet that is to be routed from a first node in a first Autonomous System (AS) to a second node in a second AS, (2) a determining mechanism configured to determine a set of bits that encodes a route in an n-ary tree that includes the first node and a root node in the first AS, (3) a generating mechanism configured to generate, based on the first packet, a second packet that includes the set of bits and an identifier associated with the second AS, and (4) a sending mechanism configured to send the second packet.

In some embodiments, the packet is an Ethernet packet, and wherein the set of bits are stored in one or more VLAN (Virtual Local Area Network) tags.

In some embodiments, the packet is an MPLS (Multi-Protocol Label Switching) packet, and wherein the set of bits are stored in one or more MPLS labels. In some embodiments, the MPLS technology conforms to RFC 3031 and any subsequent RFCs that are based on RFC 3031. In some embodiments, the MPLS technology conforms to RFC 5654 and RFC 5317.

In some embodiments, the route in the n-ary tree corresponds to a shortest path in the n-ary tree from the first node to the root node in the first AS.

DETAILED DESCRIPTION

Figure 1A:
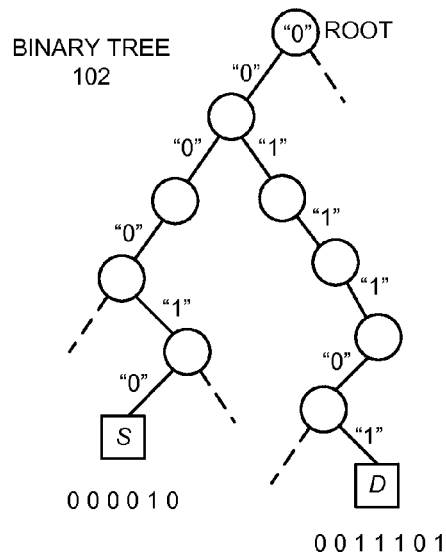
FIG. 1A illustrates how a binary address can be determined for a node in a binary tree in accordance with some embodiments described in this disclosure.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Overview

The problem of inter-domain routing is important because existing networks have large numbers of ASs and also because it enables scalable network architectures. As explained below, a binary tree can be created within a single AS, and packets can be routed based on the binary tree using source routing. However, it can be difficult to scale this binary-tree and source-routing based communication framework to very large networks because it can be very challenging to embed a binary tree in such large networks.

Some embodiments described in this disclosure provide methods and systems to perform inter-domain routing by creating multiple binary trees (ideally one rooted at each AS), and then using these multiple binary trees to perform inter-domain routing between the multiple ASs.

The network that spans the interconnections between the multiple ASs can be referred to as the core network. Some embodiments described in this disclosure provide methods and systems for using the binary-tree and source-routing based techniques in the core network. However, the methods and systems described in this disclosure are not restricted to the core network; they are generally applicable to other types of networks, such as metro networks, and enterprise-wide networks.

Scalability and resilience are some of the important aspects of an inter-domain communication framework. Methods and systems are described in this disclosure to address these two important aspects. Specifically, some embodiments provide for an alternate topology model that scales the binary tree from the point of view of providing multiple paths, thereby removing the onus of the root being a single point of failure.

The description of the inter-domain routing framework can be viewed as having two parts. The first part describes the inter-domain routing that happens between domains, i.e., between the roots of binary trees. The second part describes how a host in one domain communicates with a server in another domain.

The rest of this disclosure is organized as follows. First, the binary-tree and source-routing based communication framework is described. Second, a switch-router architecture that can be used in an n-ary-tree and source-routing based communication framework is described. Third, methods and systems for inter-domain between domains are described. Fourth, methods and systems are described that enable a host in one domain to communicate with another host in another domain.

Switches and Routers

Computer networking is typically accomplished using a layered software architecture, which is often referred to as a networking stack. Each layer is usually associated with a set of protocols which define the rules and conventions for processing packets in that layer. Each lower layer performs a service for the layer immediately above it to help with processing packets. The Open Systems Interconnection (OSI) model defines a seven layered network stack.

At a source node, each layer typically adds a header as the payload moves from higher layers to lower layers through the source node's networking stack. A destination node typically performs the reverse process by processing and removing headers of each layer as the payload moves from the lowest layer to the highest layer at the destination node.

A network can include nodes that are coupled by links in a regular or arbitrary network topology. A networking stack may include a link layer (layer 2 in the OSI model) and a network layer (layer 3 in the OSI model). The link layer (e.g., Ethernet) may be designed to communicate packets between nodes that are coupled by a link, and the network layer (e.g., Internet Protocol or IP for short) may be designed to communicate packets between any two nodes within a network.

A device that makes forwarding decisions based on information associated with the link layer is sometimes called a switch. A device that makes forwarding decisions based on information associated with the network layer is sometimes called a router. The term "switch-router" is used in this disclosure to refer to a device that is capable of making forwarding decisions based on information associated with the link layer and/or the network layer. Some embodiments described in this disclosure provide a low latency carrier class switch-router.

Unless otherwise stated, the term "IP" refers to both "IPv4" and "IPv6" in this disclosure. The use of the term "frame" is not intended to limit the present invention to the link layer, and the use of the term "packet" is not intended to limit the present invention to the network layer. In this disclosure, the terms "frame" and "packet" generally refer to a group of bits, and have been used interchangeably. Additionally, the terms "frame" or "packet" may be substituted with other terms that refer to a group of bits, such as "cell" or "datagram."

N-ary Trees and Source Routing

Some embodiments of the present invention abstract a network to an n-ary tree. A network topology, e.g., a physical ring, mesh, star, tree, or bus, can be converted to a tree. A tree can then be converted into an n-ary tree which may require the addition of dummy (virtual) nodes.

For example, when n=2, every physical node in the tree whose degree of connectivity is greater than 1×2 (i.e., one input and two outputs), can be replaced by a cluster of virtual and physical (actual) binary nodes. Note that binary nodes are nodes whose degree of connectivity is 1×2. The resulting graph can then be converted to a binary tree by disconnecting loops using a breadth first search algorithm, beginning from a root node (which may correspond to a gateway device).

A similar technique can be used to convert a network into an n-ary tree when n>2. For the sake of clarity and ease of discourse, some embodiments of the present invention have been described in the context of a binary tree (i.e., an n-ary tree in which n=2). These examples and techniques can be extended to the case when n>2. For example, when n>2, every physical node in the tree whose degree of connectivity is greater than 1×n (i.e., one input and n outputs), can be replaced by a cluster of virtual and physical (actual) n-ary nodes. Note that n-ary nodes are nodes that has one input and up to n outputs, i.e., whose degree of connectivity is 1×1, 1×2, . . . , or 1×n. The resulting graph can then be converted to an n-ary tree by disconnecting loops using a breadth first search algorithm, beginning from a root node.

Once an n-ary tree has been determined, source routing can be performed on the n-ary tree. The n-ary address of a node in an n-ary tree is allocated according to the node's position with respect to the root of the n-ary tree. Specifically, the address of a node can encode the n-ary route traversed from the root of the tree to the node.

For example, suppose a binary tree is illustrated on a sheet and a route from the root to a node is drawn along the binary tree. The root can be given the address "0." Next, a "0" can be appended whenever a "right" turn is taken in the binary route, and a "1" can be appended whenever a "left" turn is taken in the binary route. The resulting string of zeros and ones can be the binary address for the node. When n>2, each outgoing edge in a node can be represented using multiple bits, and the system can append the bits associated with an edge when the edge is taken in the n-ary route.

A source node can compute the route to a destination node if it knows its own n-ary address and the destination node's n-ary address. The n-ary route from the source node to the destination node can be represented as a bit string. The n-ary address of the source and/or destination node and the bit string that represents the n-ary route from the source node to the destination node can be stored in one or more fields of an Ethernet packet. For example, the source and/or destination address and the n-ary route can be carried in one or more VLAN (Virtual Local Area Network) tags in the Ethernet packet. In some embodiments, the source and/or destination address and the n-ary route can be carried in one or more MPLS labels of an MPLS or MPLS-TP packet.

Embodiments of the present invention can lead to significant cost-savings by facilitating multiple layer functions in a device. Further, embodiments of the present invention can lead to simple network architectures due to the homogeneity of the solution across the network. Additionally, embodiments of the present invention can reduce the energy consumption of the network due to the absence of a lookup table, because, once the n-ary address and/or routing information has been added to the packet, the decision to forward a packet at a node in the network depends entirely on the n-ary address and/or routing information. Since the lookup consists of 2 $\log_2 N$ bits in an N×N device, the latency is also reduced.

Figure 1B:
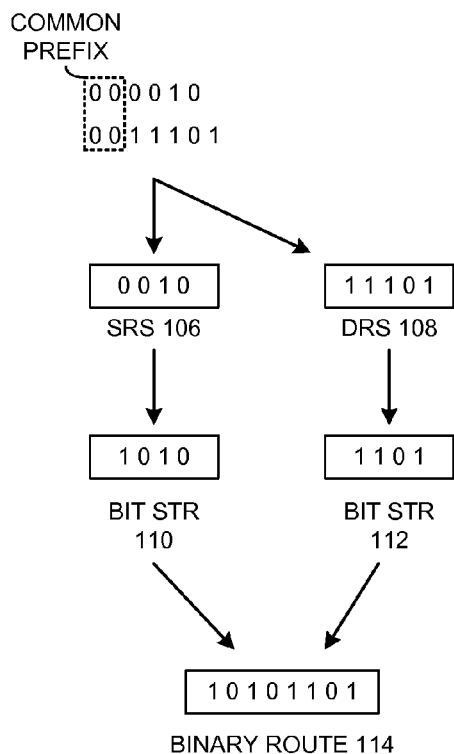
FIG. 1B illustrates how a binary route can be determined based on the source and destination binary addresses in accordance with some embodiments described in this disclosure.
Figure 1C:
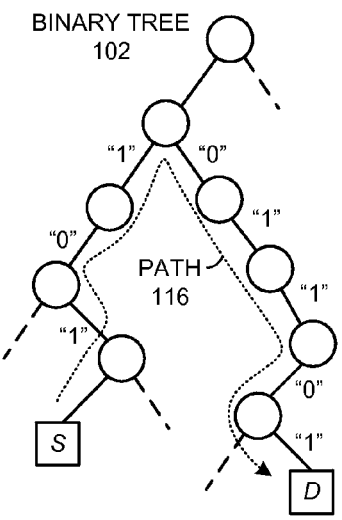
FIG. 1C illustrates how a packet can be routed in a binary tree based on a binary route in accordance with some embodiments described in this disclosure.

FIGS. 1A-1C illustrate how source routing in a binary tree can be used to forward packets in a network in accordance with some embodiments described in this disclosure.

FIG. 1A illustrates how a binary address can be determined for a node in a binary tree in accordance with some embodiments described in this disclosure. As shown in FIG. 1A, binary tree 102 can be visually represented by a set of nodes that are connected by edges. The binary address of a node can be determined by starting at the root node of binary tree 102 (which can be given the address "0"), and appending a "0" whenever a right turn is taken in the binary tree, and appending a "1" whenever a left turn is taken in the binary tree. Using this approach, the address of nodes S and D are "000010" and "0011101," respectively.

FIG. 1B illustrates how a binary route can be determined based on the source and destination binary addresses in accordance with some embodiments described in this disclosure. A binary route from a source node to a destination node can be determined as follows. First, the longest common prefix in the binary addresses of the source and destination nodes can be removed to obtain a source remnant string (SRS) and a destination remnant string (DRS), respectively. For example, as shown in FIG. 1B, the common prefix from the binary address of nodes S and D can be removed to obtain SRS 106 and DRS 108. Next, the SRS can be reversed, then complemented, and then the rightmost bit in the resulting bit string can be further complemented to obtain a first bit string. In some embodiments (e.g., embodiments in which each 1×2 node is fully bidirectional), the operation of further complementing the already complemented string can be skipped. For example, performing these operations on SRS 106 results in bit string 110. The leftmost bit in the DRS can then be removed to obtain a second bit string. For example, removing the leftmost bit in DRS 108 results in bit string 112. Finally, the first bit string and the second bit string can be concatenated to obtain the binary route. For example, bit strings 110 and 112 can be concatenated to obtain binary route 114.

FIG. 1C illustrates how a packet can be routed in a binary tree based on a binary route in accordance with some embodiments described in this disclosure. The binary route can start at the source node, e.g., node S in FIG. 1C. At each hop, the next bit in the binary route can be read, and the packet can be forwarded accordingly (in the example shown in FIG. 1C, the binary route is read from left to right). Each internal node (i.e., a node that is not a root node or a leaf node) in the binary tree has three edges. Whenever a packet comes in on an edge, the other two edges can be labeled "left" and "right" depending on their relative positions to the edge on which the packet arrived. In the example shown in FIG. 1C, if the bit is a "0," the packet can be forwarded on the right edge, and if the bit is a "1," the packet can be forwarded on the left edge. For example, if a packet starts at node S with binary route 114, the packet will be routed to node D along path 116 shown in FIG. 1C using a dotted line.

An Example of a Network and a Packet

Figure 2:
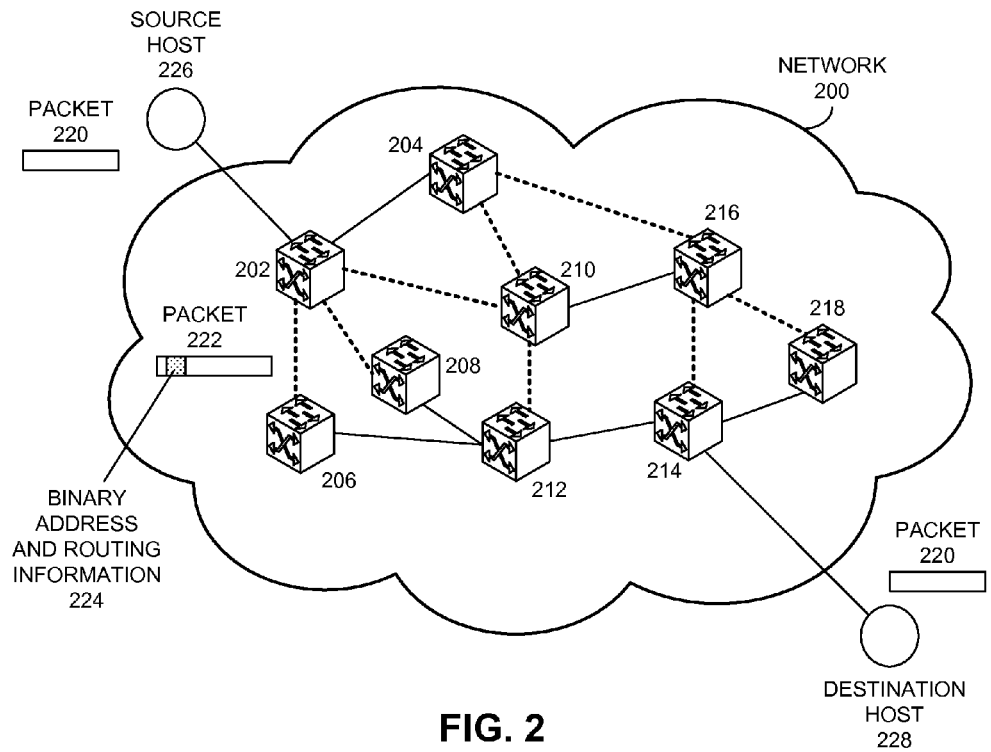
FIG. 2 illustrates how a packet can be forwarded within a network using binary information stored in the VLAN tags in accordance with some embodiments described in this disclosure.

FIG. 2 illustrates how a packet can be forwarded within a network using binary information stored in the VLAN tags in accordance with some embodiments described in this disclosure. Network 200 may include nodes 202-218 that are coupled in a mesh topology. Each node can be a switch-router that is capable of forwarding packets based on a binary tree. A binary tree rooted at node 204 may be embedded on the mesh topology as shown by the dotted lines in FIG. 2. Packet 220 may be received at ingress node 202 from source host 226, and may be destined for destination host 228 that is coupled with egress node 214. Packet 220 may include a source address associated with source host 226 and a destination address associated with destination host 228. Packet 220 may also include VLAN tags. In some embodiments, packet 220 may include MPLS labels.

Ingress node 202 can use the source and destination addresses and any VLAN tags in packet 220 to determine binary address and routing information 224. Binary address and routing information 224 may be stored in header fields that are added to packet 220 to obtain packet 222. Packet 222 can then be forwarded in network 200 based on binary address and routing information 224 until packet 222 reaches egress node 214. Egress node 214 can then remove binary address and routing information 224 from packet 222 to obtain packet 220, and forward packet 220 to destination host 228.

In some embodiments, binary and source routing is implemented using a network protocol that facilitates the inclusion of binary routing and source routing, but which is also backward compatible with a majority of existing networks. Specifically, Carrier Ethernet advances—both Provider-Backbone-Bridging-Traffic Engineering (PBB-TE and Multi-Protocol Label Switching-Traffic Profile (MPLS-TP)—use tags or labels to differentiate services, accord priorities as well as create demarcation between customers and the provider. Some embodiments use PBB-TE, an approach in which spanning tree protocol is switched off and MAC (Media Access Control) address learning is disabled to create Ethernet Switched Paths (ESPs).

PBB-TE allows new VLAN tags to be defined. Some embodiments described herein define the use of four types of VLAN tags: (1) the ARTAG (address-route tag), (2) the GTAG (granularity tag), (3) the TTAG (the type tag), and (4) the WTAG (window tag). The first three are used for forwarding packets, while the last tag (WTAG) is used for mapping TCP functions. Note that these tags may or may not be part of a standard.

In some embodiments of the present invention, packets are forwarded in the network based on the binary tree information stored in the above-mentioned VLAN tags. Unlike some conventional networks, source and destination addresses that are present in the packet when the packet is received at the ingress node are not used for forwarding the packet at each hop in the network.

Figure 3:
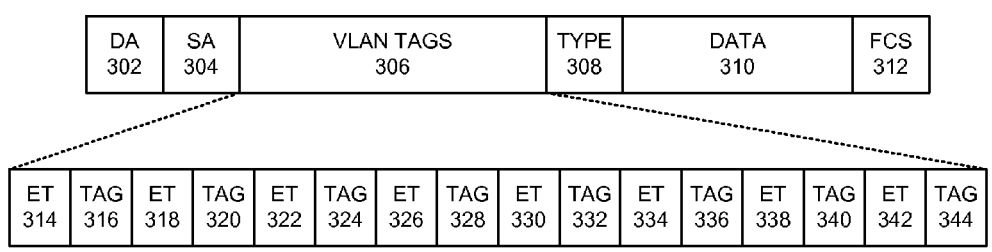
FIG. 3 illustrates an example of a packet format in accordance with some embodiments described in this disclosure.

FIG. 3 illustrates an example of a packet format in accordance with some embodiments described in this disclosure.

Ethernet packet 300 can include destination address 302, source address 304, VLAN tags 306, protocol type 308, data 310, and frame check sequence 312. Destination address 302 and source address 304 are Ethernet MAC addresses. Protocol type 308 indicates the type of payload that is being carried in data 310. Destination address 302 and source address 304 are not used for forwarding the Ethernet packet within the network. Forwarding within the network is based on the binary tree addresses and routing information stored in VLAN tags 306.

VLAN tags 306 can include pairs of tag protocol identifiers and tags. For example, VLAN tags 306 can include tag protocol identifiers 314, 318, 322, 326, 330, 334, 338, and 342, and tags 316, 320, 324, 328, 332, 336, 340, and 344. A tag protocol identifier indicates the type of tag that follows the tag protocol identifier.

At least some of the tags shown in FIG. 3 may store information related to binary addresses or routes. If the information related to a binary address or route cannot be stored in a single tag, then it may be stored over multiple tags. In some embodiments, tag 316 can store a TTAG, tag 320 can store a source-ARTAG (S-ARTAG), tags 324 and 328 can store route-ARTAGs (R-ARTAGs), tag 332 can store a GTAG, tag 336 can store a WTAG, tag 340 can store a service provider tag, and tag 344 can store a customer tag.

A TTAG can be used to differentiate the type of the packet, e.g., to differentiate between data packets, control packets and management packets. This differentiation can be based on the unique Ethertype embedded in the TTAG. The S-ARTAG can contain the address of the node (the binary route from the root) while the R-ARTAG can contain the binary route from the source node to the destination node. If the binary string that represents the source address or binary route is more than 12-bits (which is the length of a VLAN identifier), then multiple S-ARTAGs or R-ARTAGs can be used to carry the source address or binary route.

The R-ARTAG can be computed at the ingress node, and some of its bits can be updated at intermediate nodes, as the packet makes its way to the destination. Specifically, the R-ARTAG can be created dynamically for a particular source-destination pair, while the S-ARTAG can be static for each node in the network.

If the binary string depicting the route exceeds 12 bits (the size of a VLAN identifier), then multiple R-ARTAGs can be stacked. Recall that each node uses a few bits in the R-ARTAG to determine how to forward the packet. The three-bit QoS (quality of service) field and the one-bit CFI (canonical form identifier) field in the tag can be used to indicate the starting location of the bits in the R-ARTAG that a node needs to inspect to determine how to forward the packet. Initially, the four bits (three QoS bits and one CFI bit) can be set to 0000, and at each intermediate node that has N ports, the value of the 4-bits can be incremented by $\lceil \log_2 N \rceil$. When the value of these four bits reaches 1100, the R-ARTAG is no longer considered for forwarding decisions, and the node starts using bits in the next R-ARTAG until the QoS and CFI bits of the next R-ARTAG reach 1100. In this manner, each node identifies the set of $\lceil \log_2 N \rceil$ bits that are needed to perform forwarding at the node, and forwards the packet accordingly. R-ARTAGs whose QoS and CFI bits are equal to 1100 may be discarded. The S-ARTAG, on the other hand, are not altered or discarded unless a dynamic topology change occurs in the network.

The GTAG uses 9-bits in its protocol identifier to denote granularity of the connection. The WTAG or window tag can be used for error recovery purposes and for implementing multi-point TCP functions.

Switch-Router Architecture

A source host coupled to the network can either support a kernel patch that feeds n-ary address and/or routing information to the MAC layer or sends standard Ethernet packets to the switch-router. In the latter case, the incoming packet can be processed by a Thin Ethernet Logical Layer (TELL), which inserts one or more tags that carry n-ary address and/or routing information, thereby converting the incoming packet into a packet that can be processed and forwarded based on the n-ary information stored in the packet header. To this end, the TELL maintains a table that has three columns: a protocol type, an address, and an S-ARTAG. In some embodiments, the TELL may maintain a table that has two columns: an address and an S-ARTAG. The TELL enables the switch-router to map the address in the incoming packet to a corresponding S-ARTAG. The S-ARTAG can then be used to forward the packet to the egress node in the network. For example, in one of the entries of the TELL table, the protocol type can be Ethernet, the address can be an Ethernet MAC address, and the S-ARTAG can be the n-ary address of the node or host that is associated with the Ethernet MAC address.

A switch-router may or may not have the entire network-wide address database. The complete database of mappings can be stored in one or more servers, e.g., an Ethernet Nomenclature System (ENS) server, which is accessible to every switch-router. The ENS server can enable a switch-router to determine the binary address associated with a destination node whose binary address is not stored in the local TELL table. In some embodiments, the size of the TELL table in a switch-router can be K, and the TELL table may use a cache replacement policy to update entries in the TELL table. For example, in one embodiment, the TELL table can be updated using an LRU (least recently used) replacement policy. Some embodiments may use multiple ENS servers which store the network wide mapping in a distributed fashion. An address in the TELL table can be an IPv4, IPv6 (IP), MAC (Ethernet), OTN as defined in G.872 of the ITU or ISID, as defined in the IEEE802.1ah, or a port number of an edge/core device.

Figure 4:
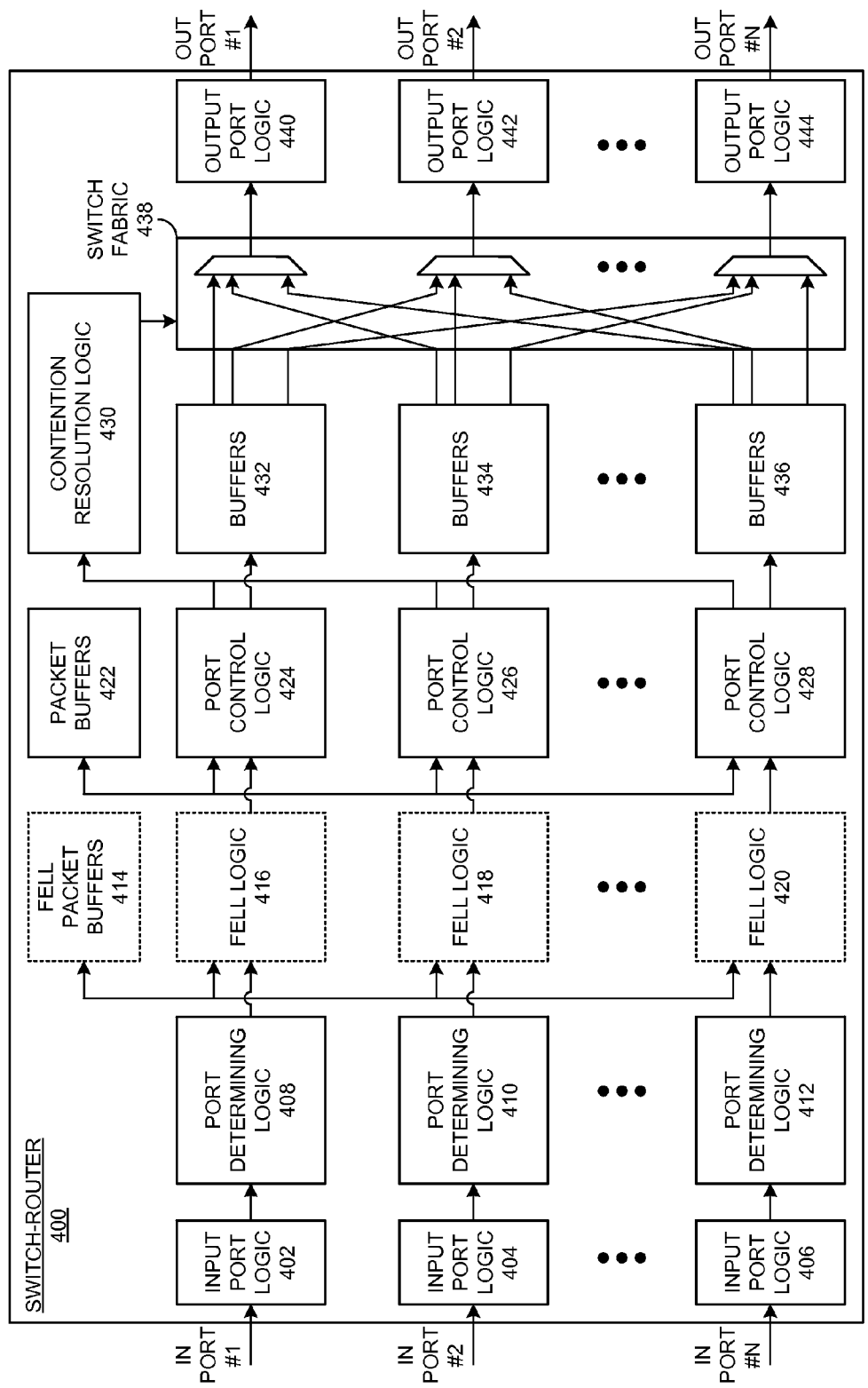
FIG. 4 illustrates a system, e.g., a switch-router, in accordance with some embodiments described in this disclosure.

FIG. 4 illustrates a system, e.g., a switch-router, in accordance with some embodiments described in this disclosure. In conventional switches and routers, latency is induced due to contention resolution and performing forwarding table lookups. If the packet has n-ary routing information, the switch-router shown in FIG. 4 does not need to perform any forwarding table lookups. However, the issue of contention resolution and head-of-line (HOL) blocking still needs to be addressed.

Implementing a completely non-blocking virtual input/output queuing switch fabric may not be tractable due to its size. If the architecture is not completely non-blocking, packets may be dropped due to contention. In some embodiments, the switch-router includes a contention resolution mechanism based on a scheme that is memory conserving while deploying a very-fast memory interaction mechanism. This mechanism is referred in this disclosure as distributed lumped buffer scheduling (DLBS).

Switch-router 400 can include a set of bidirectional ports (e.g., port #1 through port #N), input port logic 402-206, port determining logic 408-412, Fat Ethernet Logical Layer (FELL) logic 416-420, FELL packet buffers 414, port control logic 424-428, packet buffers associated with the port control logic 422, buffers 432-436, contention resolution logic 430, switch fabric 438, and output port logic 440-444. FELL logic 416-420 and FELL packet buffers 414, which are shown using dotted lines, can be optional components of switch-router 400. Specifically, FELL logic 416-420 and FELL packet buffers 414 may be included in switch-router 400 if switch-router 400 needs to implement transport layer functionalities, e.g., window based flow control. Specifically, FELL logic 416-420 and FELL packet buffers 414 may combine the functionality of a link layer (e.g., Ethernet MAC layer), a network layer (e.g., IP layer), and a transport layer (e.g., UDP (User Datagram Protocol) or TCP (Transmission Control Protocol)) into a single layer. For example, FELL logic 416-420 can create a soft-buffer for each TCP (Transmission Control Protocol) or UDP (User Datagram Protocol) socket, and schedule data from the soft-buffer to implement a flow control mechanism, e.g., a sliding window flow control mechanism. In conventional networking stacks, a user level application can open a socket with a transport layer and use the socket to send and receive data. In a conventional system, when a user application sends or receives data through a socket, the data moves through the different layers in the networking stack, which may create inefficiencies. In contrast, in embodiments of the present invention that include FELL logic 416-420 and FELL packet buffers 414, a user level application can open a socket directly with the FELL layer (instead of a transport layer) and use the socket to send and receive data.

In some embodiments, the bits in the binary address of a packet that are relevant to the current node are resolved by input port logic 402-406. Once the appropriate bits in the binary tag have been identified, switch-router 400 can check whether the output buffer corresponding to the output port is free. If so, the packet can be forwarded using an express path, to the corresponding output port in a single clock cycle, thus achieving fast switching and/or routing.

When included in switch-router 400, FELL logic 416-420 can perform processing that is analogous to TELL processing performed by TELL logic 506, but may be more process intensive and may involve processing packets that contain information beyond ARTAGs.

Once the output port for a packet has been determined, the packet can be provided to the output port by a sub-system that comprises port control logic 424-428, packet buffers 422, contention resolution logic 430, buffers 432-436, and switch fabric 438. Specifically, if the output buffer corresponding to the output port is not free, the packet is either stored in a close-to-the-switch cache (e.g., buffers 432-436) or if the cache is occupied, then the packet is stored in an off-chip memory (e.g., packet buffers 422).

The communication between the off-chip memory (e.g., packet buffers 422) and other components (e.g., port control logic 424-428) in switch-router 400 may have a large latency, especially since the bandwidth of the communication channel is shared between the 2×N ports (for concurrent read and write) in addition to access time latencies of the memory. Some embodiments alleviate this problem by partitioning the memory into collocated buffers that are lumped together, and which can be fetched together using a lumped table approach.

Input port logic 402-206 receives packets. In some embodiments, input port logic 402-206 can receive packets from the Ethernet PHY layer by supporting the GMII (Gigabit Medium Independent Interface) or XAUI (10 Gigabit Attachment Unit Interface) thus enabling correct reception of packets from the PHY (which may be located outside switch-router 400). In some embodiments, input port logic 402-206 converts the received packets into a format that is compatible with other components in switch-router 400. For example, input port logic 402-206 may add a local time-stamp and data-valid bits to the received packets.

Port determining logic 408-412 determines if an incoming packet includes n-ary address and/or routing information or whether n-ary address and/or routing information needs to be added to the packet. If the packet does not contain n-ary address and/or routing information, then the packet is sent to TELL logic, which can add the n-ary address and/or routing information, or drop the packet if the header information in the packet cannot be mapped to n-ary address and/or routing information. As explained above, the TELL logic may maintain a TELL table that has three columns: a protocol type, an address, and an S-ARTAG. The TELL logic enables the switch-router to map the address in the incoming packet to a corresponding S-ARTAG. In some embodiments, the size of the TELL table in a switch-router can be K, and the TELL table may use any cache replacement policy to update entries in the TELL table. For example, in one embodiment, the TELL table can be updated using an LRU (least recently used) policy. If a packet arrives whose protocol identifier is not part of the TELL table, the node can communicate with the ENS server and fetch the corresponding n-ary address and/or routing information.

Figure 5:
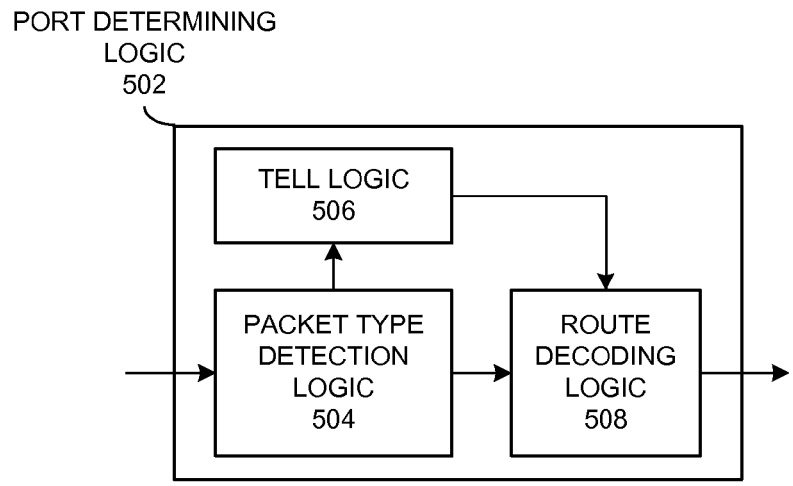
FIG. 5 illustrates a port determining logic block in accordance with some embodiments described in this disclosure.

FIG. 5 illustrates a port determining logic block in accordance with some embodiments described in this disclosure.

Port determining logic 502 can include TELL logic 506, packet type detection logic 504, and route decoding logic 508. Packet type detection logic 504 can determine whether a packet has n-ary address and/or routing information. If so, packet type detection logic 504 can provide the packet to route decoding logic 508. If the packet does not have n-ary address and/or routing information, packet type detection logic 504 can provide the packet to TELL logic 506. TELL logic 506 can then add the appropriate n-ary address and/or routing information to the packet and provide the packet to route decoding logic 508. Route decoding logic 508 can use the n-ary address and/or routing information in the packet to determine the output port over which the packet is to be forwarded.

Specifically, if the packet is a control packet, then route decoding logic 508 can send the packet to a local port for management purposes. On the other hand, if the packet is a data packet, then route decoding logic 508 can decode the R-ARTAGs in the packet. In particular, route decoding logic 508 can read the active R-ARTAG (i.e., the one that corresponds to a non-zero marker) to obtain the n-ary address and/or routing information. Next, route decoding logic 508 can read the appropriate set of $\lceil \log_2 N \rceil$ bits. This information can then be used by route decoding logic 508 for locating the appropriate output port. Route decoding logic 508 can also increment the non-zero marker in the R-ARTAG so that the switch-router at the next hop can extract the appropriate bits in the R-ARTAG.

If route decoding logic 508 determines that the output port buffer for the packet is not free, switch-router 400 can use the DLBS scheme to resolve the contention. Specifically, a buffer (e.g., buffers 432) can be provided for each port. The buffer may have limited storage space, e.g., it may have space for eight maximum transmission units (MTUs). If the packet fits into this buffer then it is stored here. If however, the packet cannot be fit in the buffer, it has to be stored in the off-chip memory (e.g., packet buffers 414). One of the problems with the interaction between off-chip memory and on-chip components can be the limited amount of bandwidth that is available for the interaction. This problem can be alleviated by using a lumped table as explained below.

Figure 6A:
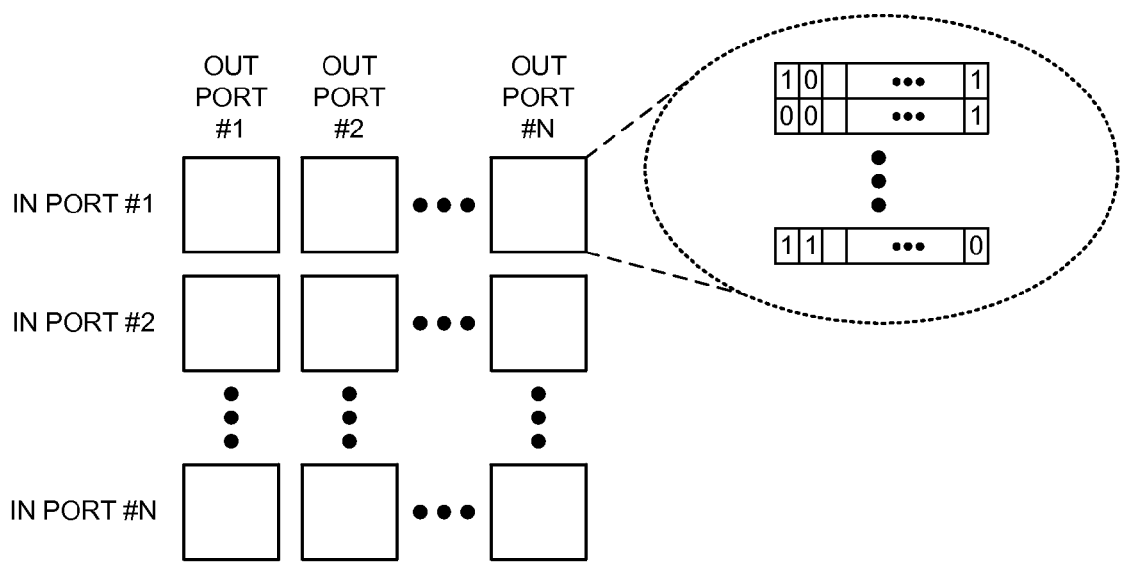
FIG. 6A illustrates how buffers for ports can be stored in a lumped table in accordance with some embodiments described in this disclosure.

FIG. 6A illustrates how buffers for ports can be stored in a lumped table in accordance with some embodiments described in this disclosure.

In some embodiments of the present invention, the buffers for all the ports are lumped together in N×N memory blocks as shown in FIG. 6. Each memory block corresponds to an input-output port combination (and hence, there are $N^2$ distinct memory blocks). Each memory block has a number of MTU sized cells marked with different priority levels. A zero-value in the lumped table, corresponding to a particular cell, indicates that no packet is being stored at the corresponding location. A one-value implies that the cell is currently occupied. Whenever an output port is free, the contention resolution block examines the lumped table and fetches the packet that is currently in the memory with the highest priority. The fetched packet is sent directly to the output port, or if a new packet arrives that causes contention, then the fetched packet is temporarily stored in buffers 432-436 before transmission. In some embodiments, each memory block in the off-chip memory module can include storage space for each priority levels. Specifically, the storage space for a particular priority level can store a certain number of packets of that priority level.

Figure 6B:
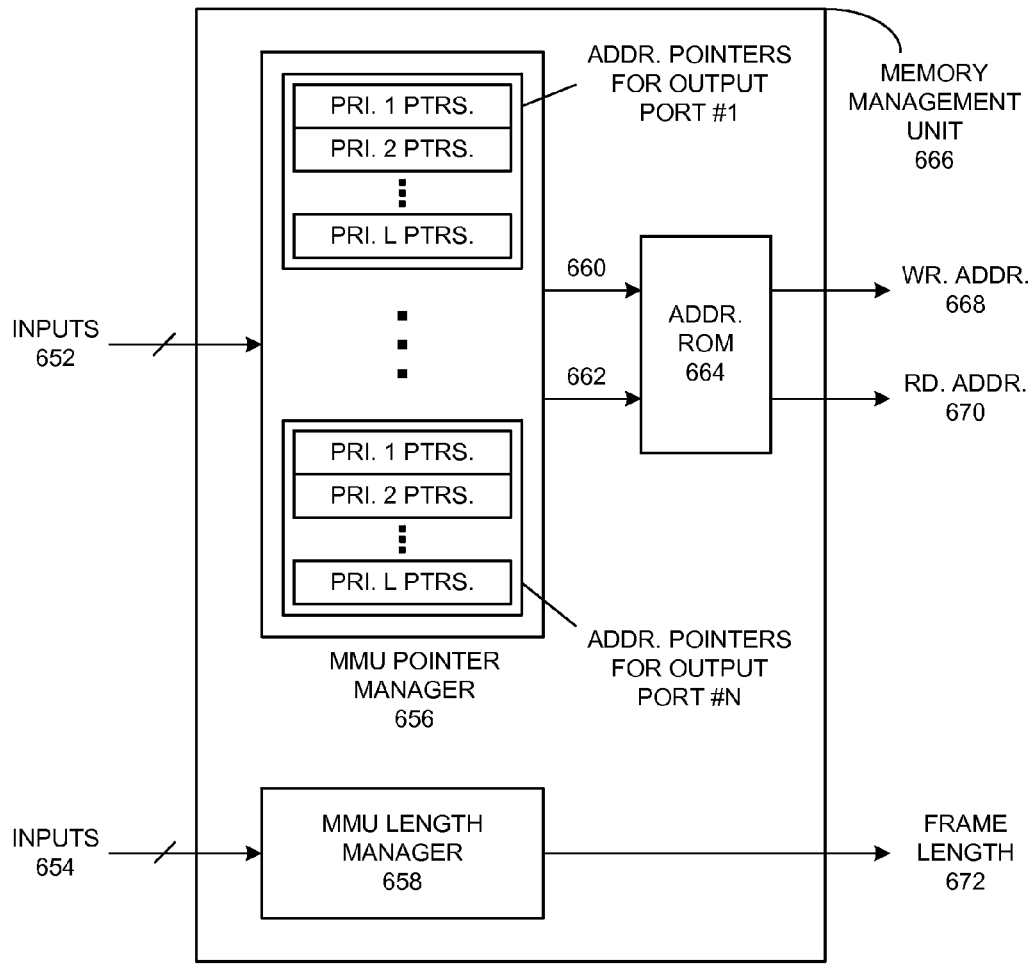
FIG. 6B illustrates a memory management unit (MMU) that can be used to access the lumped memory buffer in accordance with some embodiments described in this disclosure.

FIG. 6B illustrates a memory management unit (MMU) that can be used to access the lumped memory buffer in accordance with some embodiments described in this disclosure.

MMU 666 can include MMU pointer manager 656, MMU length manager 658, and address read-only memory (ROM) 664 or a RAM. MMU pointer manager 656 can store read and write pointers for each priority level for each memory block in the lumped buffer. As shown in FIG. 6B, MMU pointer manager 656 can store pointers for priority levels 1 through L for output ports 1 through N.

MMU pointer manager 656 can receive inputs 652, which can include an output port number on which the packet is being sent, a priority level of the packet, a read request pointer which identifies a buffer from which data is to be read, a write request pointer that identifies a buffer to which data is to be written, an increment read pointer signal which indicates that a read pointer is to be incremented, and a increment write pointer signal which indicates that a write pointer is to be incremented. Based on inputs 652, MMU pointer manger 656 can generate write address pointer 660 and read address pointer 662, which can be used to look up write address 668 and read address 670, respectively. Write address 668 and read address 670 can be used to access a starting memory address in the lumped memory buffer where data is to be written or from which data is to be read.

MMU length manager 658 can receive inputs 654, which can include an output port number on which the packet is being sent, a priority level of the packet, an update length, and a frame write length. Based on inputs 654, MMU length manager 658 can generate frame length 672 which can be used to access data stored in a block of memory addresses which start at the memory address specified by write address 668 or read address 670.

Switch fabric 438 can be a fully non-blocking virtual output queued switch fabric. Switch fabric 438 can be visualized as having a multiplexer per output port. Buffers 432-436 can serve as the input stage for the multiplexers. The connection between the input and output port can be setup by contention resolution logic 430. Contention resolution logic 430 can generate the select signals for the output port multiplexers based on the priority of the incoming packets and availability of the output port.

Output port logic 440-444 can serve two functions. First, at the egress node, output port logic 440-444 can remove the tags that were added at the ingress node (e.g., R-ARTAG). Note that if the egress switch is coupled with a device that can process R-ARTAGs, S-ARTAGs, etc., then the tags may not need to be removed. Second, output port logic 440-444 can interface with the PHY (physical layer) and implement a GMII or XAUI interface.

Figure 7A:
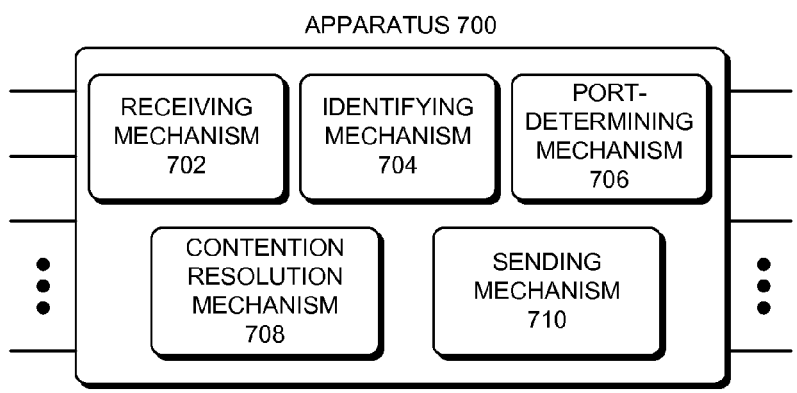
FIG. 7A illustrates an apparatus in accordance with some embodiments described in this disclosure.

FIG. 7A illustrates an apparatus in accordance with some embodiments described in this disclosure.

Apparatus 700 can include a plurality of mechanisms which may communicate with one another via a communication channel, e.g., a bus. One or more mechanisms in apparatus 700 may be realized using one or more field-programmable gate arrays (FPGAs) or application-specific integrated circuits (ASICs).

In some embodiments, apparatus 700 is a switch-router which includes receiving mechanism 702, identifying mechanism 704, port-determining mechanism 706, contention resolution mechanism 708, and sending mechanism 710.

Receiving mechanism 702 may be configured to receive a packet on an input port. In some embodiments, receiving mechanism 702 may correspond to input port logic 402-406 shown in FIG. 4. In some embodiments, apparatus 700 may have N bidirectional ports, i.e., each bidirectional port may include an input port and an output port.

In some embodiments, apparatus 700 may include a type-determining mechanism configured to determine whether the packet is a control packet, and sending mechanism 710 may be configured to send the packet to a management port if the packet is determined to be a control packet by the type-determining mechanism. In some embodiments, the type-determining mechanism can correspond to packet type detection logic 504 shown in FIG. 5.

In some embodiments, apparatus 700 may include a format-determining mechanism configured to determine whether the packet conforms to a format that includes the set of bits that represents the route from the source node to the destination node in the n-ary tree. Apparatus 700 may further include an adding mechanism configured to add the set of bits if the packet does not conform to the n-ary tree based packet format. For example, if the packet does not have R-ARTAGs, S-ARTAGs, etc., then the adding mechanism can add the appropriate set of R-ARTAGs, S-ARTAGs, etc., to the packet. In some embodiments, the format-determining mechanism may correspond to packet type detection logic 504 shown in FIG. 5, and the adding mechanism may correspond to TELL logic 506 shown in FIG. 5.

Identifying mechanism 704 may be configured to identify a set of bits in the packet that represents a route from a source node to a destination node in an n-ary tree. Port-determining mechanism 706 may be configured to determine an output port based on a subset of the set of bits. The number of bits in the subset of the set of bits can be $\lceil \log_2 N \rceil$, wherein N is the number of output ports. In some embodiments, the packet can be an Ethernet packet, and the set of bits can be stored in one or more VLAN tags. The location of the subset of the set of bits in the one or more VLAN tags can be encoded using the three-bit QoS fields and the one-bit CFI fields in the VLAN tags. In some embodiments, the packet can be an MPLS or MPLS-TP packet. In some embodiments, identifying mechanism 704 and port-determining mechanism 706 may correspond to port determining logic 408-412.

Contention resolution mechanism 708 may be configured to determine whether the output port is free. Sending mechanism 710 may be configured to store the packet in a buffer if the output port is not free, and send the packet through the output port if the output port is free. In some embodiments, contention resolution mechanism 708 may correspond to contention resolution logic 430 shown in FIG. 4. Sending mechanism 710 may correspond to port control logic 424-428, buffers 432-436, switch fabric 438, and output port logic 440-444.

In some embodiments, apparatus 700 may include N×N memory blocks, wherein N is the number of output ports. Each memory block can be associated with an input port and an output port, and each memory block can include buffers for storing packets that are received on the associated input port and which are destined for the associated output port. In some embodiments, the N×N memory blocks may correspond to the memory blocks shown in FIG. 6.

Figure 7B:
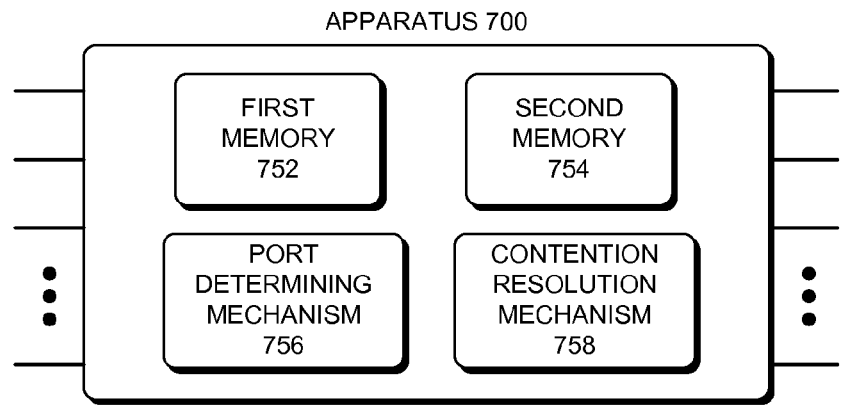
FIG. 7B illustrates an apparatus in accordance with some embodiments described in this disclosure.

FIG. 7B illustrates an apparatus in accordance with some embodiments described in this disclosure.

Apparatus 750 can include a plurality of mechanisms which may communicate with one another via a communication channel, e.g., a bus. One or more mechanisms in apparatus 750 may be realized using one or more field-programmable gate arrays (FPGAs) or application-specific integrated circuits (ASICs).

In some embodiments, apparatus 750 is a switch-router which includes input ports to receive packets, output ports to send packets, first memory 752, second memory 754, port-determining mechanism 756, and contention resolution mechanism 758.

First memory 752 may have a lower latency than second memory 754. First memory 752 can correspond to local on-chip buffers 432-436. Second memory 754 can correspond to global off-chip packet buffers 422. Port determining mechanism 756 can be configured to determine an output port for a packet. Port determining mechanism 756 can correspond to port determining logic 408-412.

Contention resolution mechanism 758 can include contention resolution logic 430, port control logic 424-428, and switch fabric 438. Contention resolution mechanism 758 can be configured to provide the packet to the output port if the output port is free. Contention resolution mechanism 758 can determine whether the output port is busy and whether space is available in the first memory to store the packet. If the output port is busy and space is available in the first memory, contention resolution mechanism 758 can store the packet in the first memory. However, if the output port is busy and space is not available in the first memory to store the packet, contention resolution mechanism 758 can then determine whether a lower-priority packet is currently stored in the first memory that can be pre-empted by the received packet. If so, contention resolution mechanism 758 can pre-empt the lower-priority packet by moving the lower-priority packet to the second memory, and storing the received packet in the first memory. However, if the output port is busy, space is not available in the first memory to store the packet, and there are no lower-priority packets in the first memory that can be pre-empted, contention resolution mechanism 758 can store the packet in the second memory.

Figure 8A:
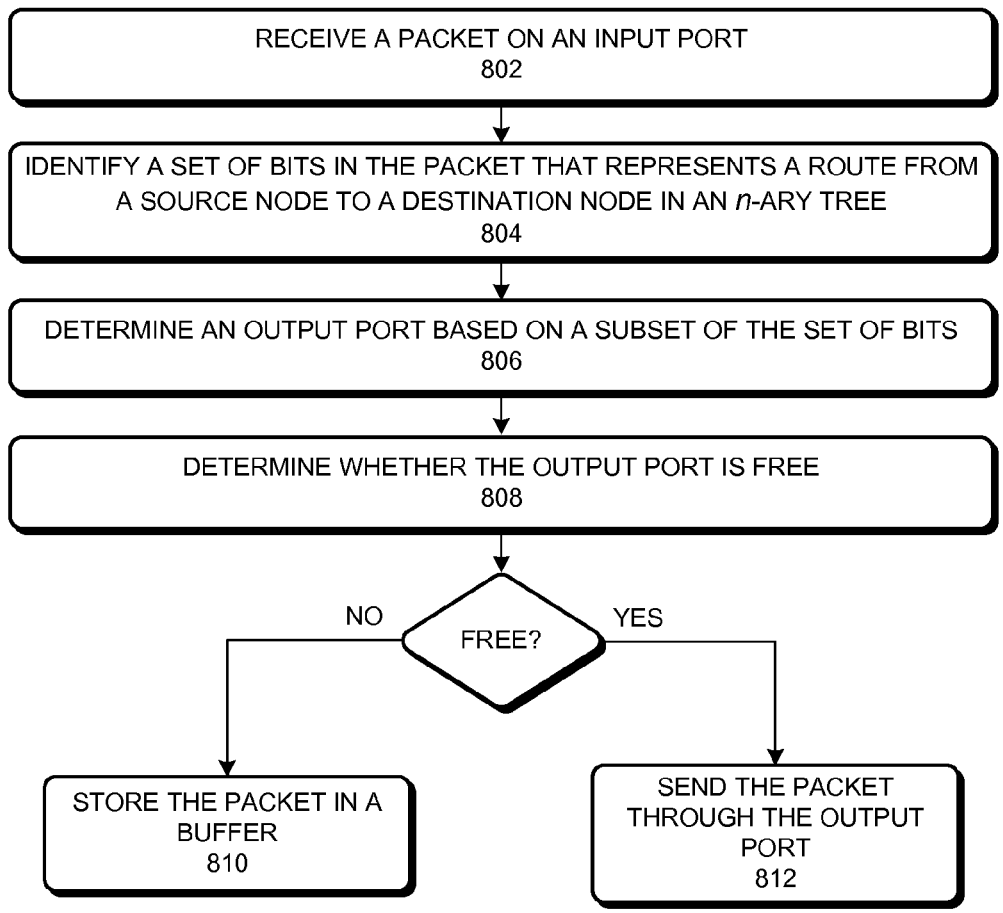
FIG. 8A presents a flowchart that illustrates a process for forwarding packet in accordance with some embodiments described in this disclosure.

Once the packet is stored in the second memory, contention resolution mechanism 758 can either provide the packet to the output port or move it back to the first memory. Specifically, contention resolution mechanism 758 can determine whether the output port is busy and whether there is space in the first memory to store the packet. If output port is free and the first memory does not contain any packets, contention resolution mechanism 758 can provide the packet to the output port. On the other hand, if the output port is busy, but the first memory has space for storing the packet, contention resolution mechanism 758 can move the packet to the first memory so that it can subsequently be sent out of the output port. FIG. 8A presents a flowchart that illustrates a process for forwarding packet in accordance with some embodiments described in this disclosure.

The process can begin by receiving a packet on an input port of a switch-router (operation 802). Next, the switch router can identify a set of bits in the packet that represents a route from a source node to a destination node in an n-ary tree (operation 804). The switch-router can then determine an output port based on a subset of the set of bits (operation 806). Next, the switch-router can determine whether the output port is free (operation 808). If the output port is not free, the switch-router can store the packet in a buffer (operation 810). The buffer can be a local on-chip buffer or a global off-chip lumped buffer. On the other hand, if the output port is free, the switch-router can send the packet through the output port (operation 812).

Figure 8B:
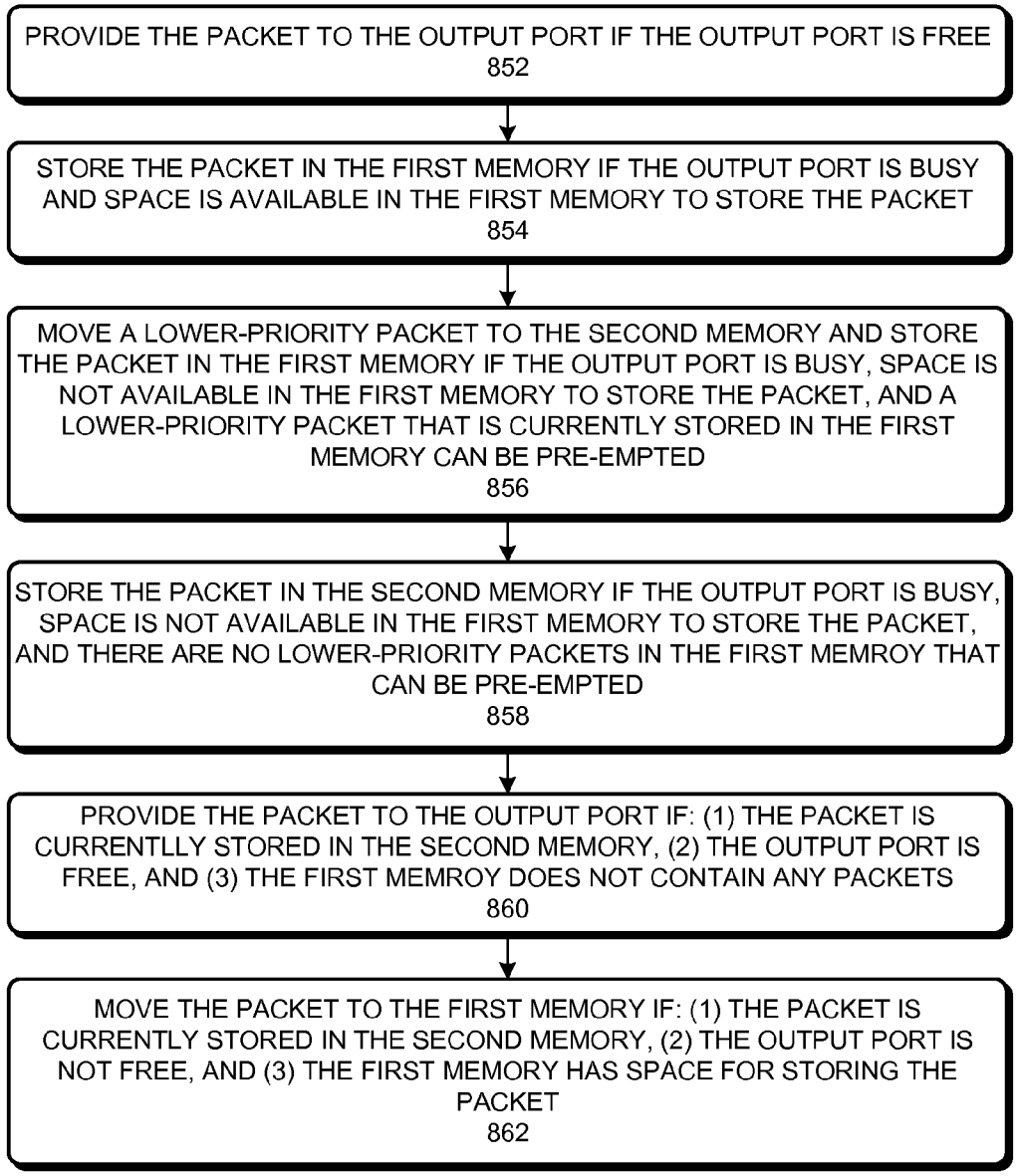
FIG. 8B presents a flowchart that illustrates a process for resolving contentions in accordance with some embodiments described in this disclosure.

FIG. 8B presents a flowchart that illustrates a process for resolving contentions in accordance with some embodiments described in this disclosure.

The system can provide the packet to the output port if the output port is free (operation 852). The system can store the packet in the first memory if the output port is busy and space is available in the first memory to store the packet (operation 854). The system can move a lower-priority packet to the second memory and store the packet in the first memory if the output port is busy, space is not available in the first memory to store the packet, and a lower-priority packet that is currently stored in the first memory can be pre-empted (operation 856). The system can store the packet in the second memory if the output port is busy, space is not available in the first memory to store the packet, and there are no lower-priority packets in the first memory that can be pre-empted (operation 858). The system can provide the packet to the output port if: (1) the packet is currently stored in the second memory, (2) the output port is free, and (3) the first memory does not contain any packets (operation 860). The system can move the packet to the first memory if: (1) the packet is currently stored in the second memory, (2) the output port is not free, and (3) the first memory has space for storing the packet (operation 862).

Inter-Domain Routing

Figure 9:
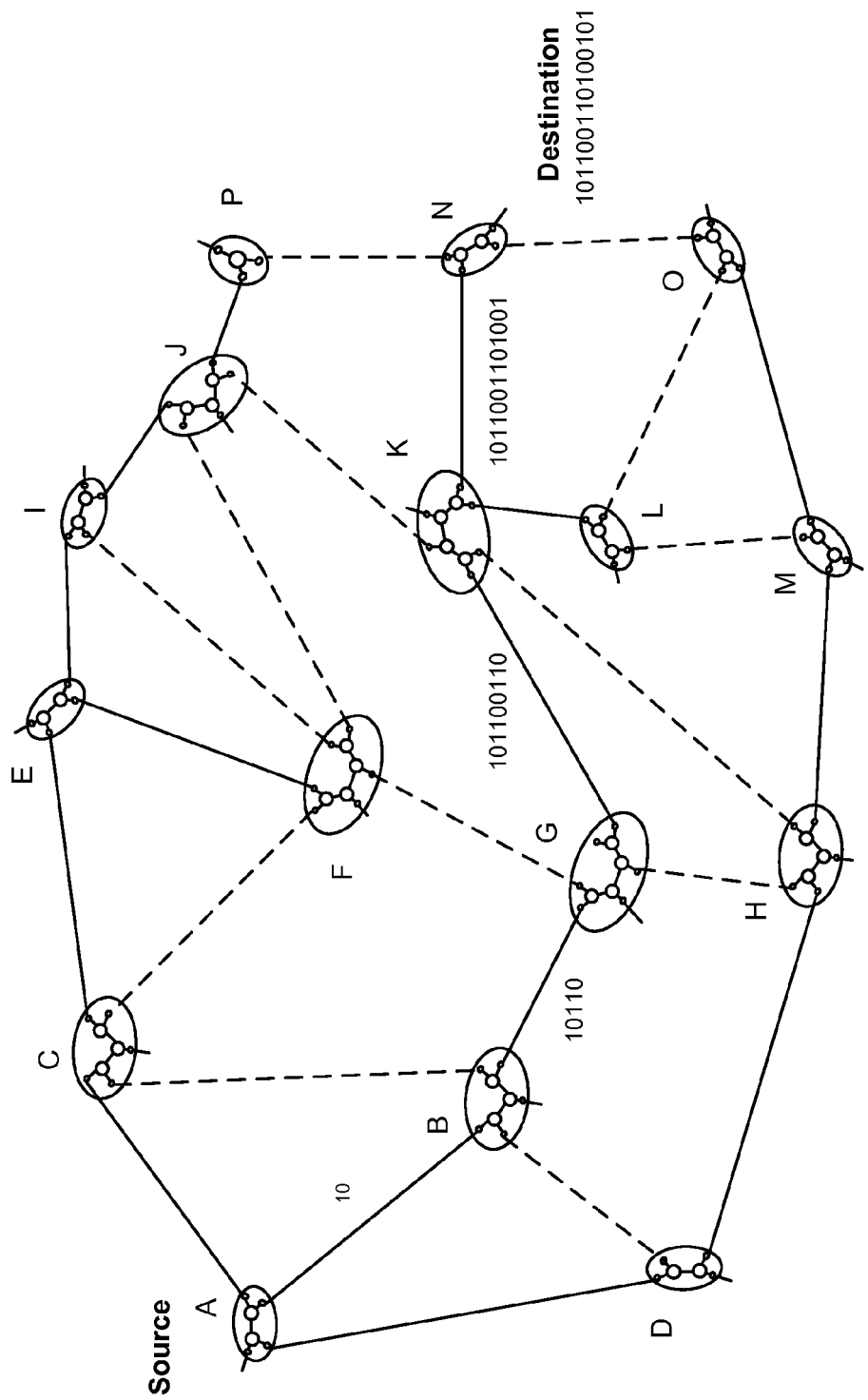
FIG. 9 illustrates an apparatus in accordance with some embodiments described in this disclosure.

FIG. 9 illustrates an interconnection network connecting multiple AS roots in accordance with some embodiments described in this disclosure.

Each letter ("A" through "P") corresponds to an AS. Each AS is shown in FIG. 9 as an ellipse which includes nodes within it. The solid lines correspond to the n-ary tree, and the dashed lines correspond to links that are not part of the n-ary tree disconnected to make the tree. The source node is "A" and the destination node is "N." The bit strings correspond to the bit string representation of the route from node "A" to node "N." The ASs and the links that connect the ASs with one another form the core network.

Without loss of generality, let us assume that each AS has at least one termination point in the core network as shown in FIG. 9. Our desire is to be able to communicate between AS termination points using an n-ary-tree and source-routing based communication architecture.

The challenge in inter-domain routing can be stated as follows. In intra-domain communication, we disconnect some links to create a binary tree and justify this action by utilizing the benefit of a binary tree and assuming traffic aggregation (and hence distribution). However, this justification may not hold true for inter-domain communication. Specifically, in the inter-domain case, we are forced to make use of the actual physical topology. The challenge in inter-domain routing can then be stated as follows: how can we make good use of the physical topology (graph) and yet be able to support the features of an n-ary-tree/binary routing and source-routing based communication architecture.

Some embodiments described herein solve this problem by creating multiple binary trees—one tree rooted at each interconnecting node (AS terminating point). Each of these trees is a virtual tree, which is explained below.

Consider a graph, G(V,E), whose every vertex is an AS. We create binary trees, each of which is rooted at a vertex. The binary tree rooted at node V=Ni is called the ith binary tree, and the ith tree has for its members, all the V vertices in the interconnecting graph.

In some embodiments, the system first converts the entire graph (i.e., the graph corresponding to the core network between the ASs and each of the AS networks) into a binary graph. To do so, we consider each node whose degree of connectivity is greater than 1×2. We then replace this node with a cluster of 1×2 switches. In effect, a node with degree of connectivity D is replaced by a binary tree with 2 log D binary nodes. One of these nodes is called a local access node, i.e., the node from where other ASs can reach inside the AS rooted at this node. The local access node is the ith node for that AS. This node interconnects the inter-domain network (multiple ASs) to nodes within its AS.

The next operation is to compute weights on the graph. This operation is optional and can be skipped if we choose to assume that every link has the same weight (or some cost function) as every other link in the graph. To implement this in an n-ary-tree source-routing communication framework, we assume that nodes exchange control frames (e.g., a frame in which the TTAG is set to a value that indicates that the frame is a control frame) and a time-stamp value embedded in the data-field of the frame. Neighbor nodes can hence use the time-stamp value to compare the cost functions. Setting time-stamp values can be performed through the ranging process, e.g., the ranging processes that are used in passive optical network (PON) systems.

Next, the system can create one binary tree from the local access node to all the nodes in the network. This tree has as its members every local access node from the set V. Since there are multiple possible binary trees that can be embedded to include all the local access nodes in the set V, in some embodiments, the system finds a minimum cost tree from the possible set of trees. Hence, if the links in E are defined by the weights as mentioned above, then the embedded binary tree would have the least weight amongst all the possible binary tree embeddings. On the other hand, if we do not assume the links in E to have weights, then the binary tree chosen would have the least number of links (to every node).

Once every node in the network has been converted into a binary tree, the next step is to perform addressing and routing in each tree and thereby facilitate inter-domain communication. Each tree is given a unique name. Specifically, in some embodiments, each tree is identified based on its local access node which is assumed to be unique. Some embodiments can use an Ethertype that we can define as "name-tag" that supports a VLAN tag implementation. In some embodiments, the name tag can be assigned a unique value by converting the 48 bit MAC address (of the switch-port) to the 16 bit VLAN tag using a hash function. Conflicts should be rare if an appropriate hash functions is used, and can be dealt with using a number of techniques. For example, in some embodiments, the conflicting nodes can rehash to get a unique local access node name. Security issues in case of conflict can be resolved by comparing the position of the local access node via multiple known nodes in the graph G.

Once every local access node (and hence an AS termination node) in the graph G, has its own binary tree, it can send a control message to each node in the tree giving the node a unique address. For this purpose, a topology discovery mechanism (explained below) can be used. Note that a node can have N addresses, one address for each binary tree rooted at each node. But the node does not need to know its address on any other binary tree; the node only needs to know its address on its own binary tree, i.e., the tree that it subtends. For this tree, the address of this node is by default "0" as the node is the root of this tree.

As explained above, a frame that passes through a node contains the route to the destination (the R-ARTAG). All that the node does is to select the $\log_2 N$ bits corresponding to itself and forward the frame to a port based on the selected bits.

A process for inter-domain routing in accordance with some embodiments can be explained in reference to FIG. 9, which shows multiple ASs connected across a backbone network. Note that the backbone network shown in FIG. 9 has been abstracted into a binary graph.

Let us assume we desire to communicate from Ni to Nj, i.e., from the ith AS to the jth AS. Let us also assume that Nq desires to also communicate to Nr, i.e., from the qth AS to the rth AS. Further, let us assume that both the local access nodes Ni and Nq have created binary trees based on a process that is described below.

Hence, both Ni and Nq are aware of the topology interconnecting the ASs as well as the shortest path to all the AS local access nodes (i.e., the binary tree roots). A packet arriving from within the ith AS at local access node Ni and destined for a node within AS j is routed as follows. (1) The local access node checks if the arriving packet has the correct destination binary tag of the destination within AS j. This information will be embedded in the data packets as the source node (within i) would have fetched this information through the local (intra AS) ENS or global ENS. (2) Next, the destination MAC, IPv4/IPv6, and/or URL information of the arriving packet can be mapped against the binary tree, rooted at the local access node Ni. The system may determine that the AS is supported by local access node Nj. (3) Node Ni can then compare the entries on its binary tree and use these to create an outer R-ARTAG value from itself to node Nj—the local access node of the AS j. In some embodiments, the outer R-ARTAG value enables inter-domain communication. (4) Binary routing between Ni and Nj occurs and the frame reaches Nj. Upon reaching Nj, it is sent into the AS, as the outermost R-ARTAG—the one required for inter-domain routing is now discarded (as its LSB value now reaches 1).

Figure 10:
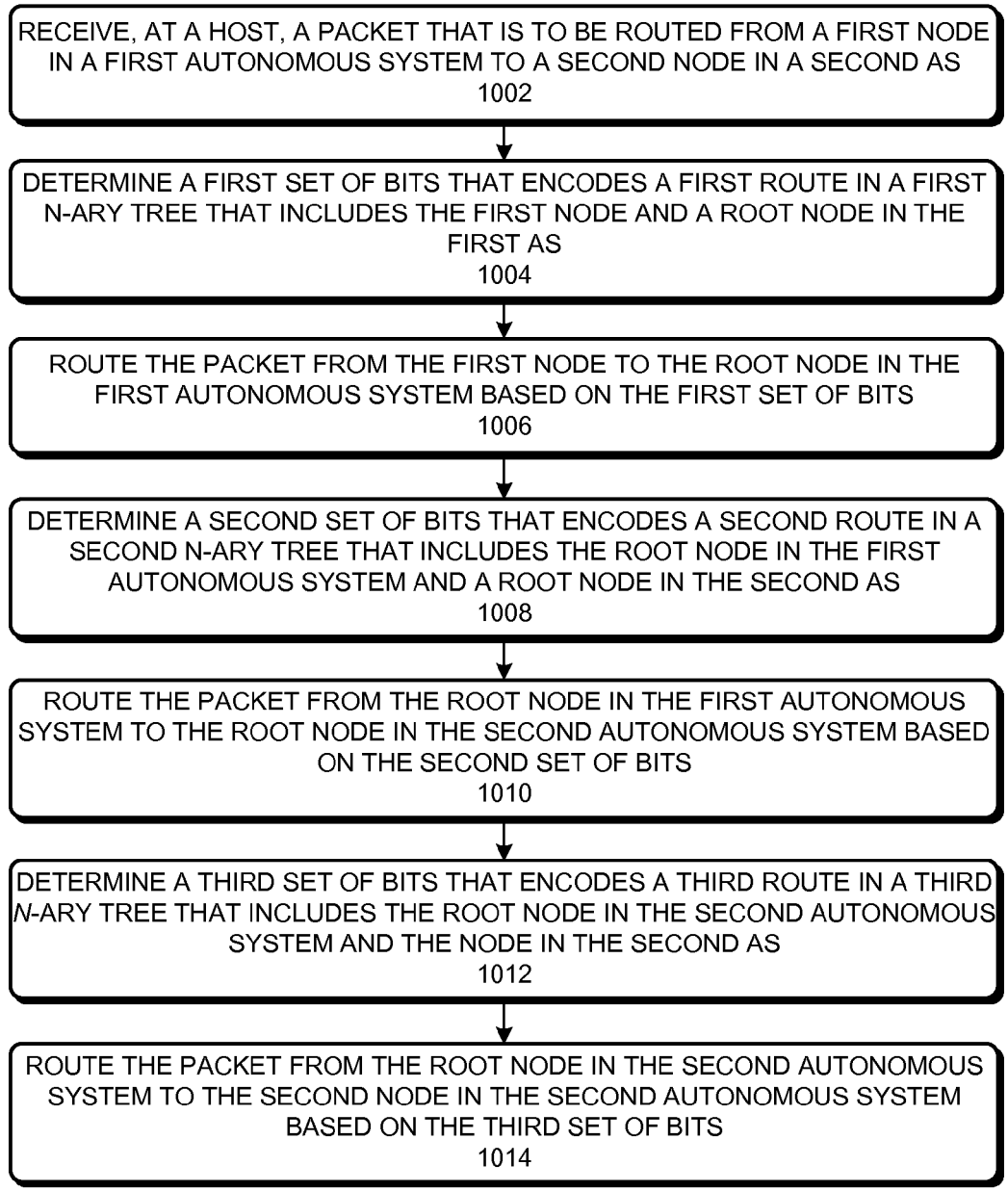
FIG. 10 presents a flowchart that illustrates a process for communicating a packet from a first node in a first AS to a second node in a second AS in an n-ary-tree and source-routing based communication architecture in accordance with some embodiments described in this disclosure.

FIG. 10 presents a flowchart that illustrates a process for communicating a packet from a first node in a first AS to a second node in a second AS in an n-ary-tree and source-routing based communication architecture in accordance with some embodiments described in this disclosure.

The process can begin by receiving, at a host, a packet that is to be routed from a first node in a first AS to a second node in a second AS (operation 1002). Next, the host can determine a first set of bits that encodes a first route in a first n-ary tree that includes the first node and a root node in the first AS (operation 1004). The packet can then be routed from the first node to the root node in the first AS based on the first set of bits (operation 1006). Next, the root node in the first AS can determine a second set of bits that encodes a second route in a second n-ary tree that includes the root node in the first AS and a root node in the second AS (operation 1008). The packet can then be routed from the root node in the first AS to the root node in the second AS based on the second set of bits (operation 1010). Next, the root node in the second AS can determine a third set of bits that encodes a third route in a third n-ary tree that includes the root node in the second AS and the node in the second AS (operation 1012). The packet can then be routed from the root node in the second AS to the second node in the second AS based on the third set of bits (operation 1014).

The topology discovery mechanism (which can also assign weights to the links) is now described. At start up, every node can send to every connected node a name type control packet (TTAG) with a request-to-time-stamp embedded as, for example, the Ethertype. The receiving node (which is adjacent to the sending node) receives the packet and sends it back to the transmitting node (we assume that all the links are bi-directional). Further, while responding back, the receiving node, (downstream), sends a time-stamp value in the packet.

Although time synchronization throughout the network is not necessary, nodes are able to have pseudo-synchronization amongst adjacent nodes by toggling the request-to-time-stamp packet between adjacent pairs as follows.

Consider two adjacent nodes N1 and N2 with N1 being upstream of N2 (i.e., N1 desires to range with N2). N1 first sends a control packet with a request-to-time-stamp (e.g., by embedding the time-stamp in its Ethertype) to N2. N2 in response sends the same packet with a processing-value in the data field. This processing value is the amount of time (in seconds) that N2 required to process and send back the packet it received from N1. N1 upon receiving the packet back computes the time difference between sending the packet (to N2) and receiving the packet (from N2). This time now corresponds to the round trip time plus the processing time at N2. However, since the second term (processing value) is known to N1 through the received packet, N1 also now knows the RTT. It can hence compute the weight or distance between itself and N2. In this way weights can be assigned to all links in the graph.

In some embodiments, the time-stamps are only pseudo-synchronous, meaning that the synchronization between nodes is weak, e.g., the synchronization may not align leading or trailing edges. If the lag between two adjacent nodes is less than the minimum update interval, the system can yet work efficiently. The minimum update interval is defined as the minimum amount of time between two successive topology update messages—typically of the order of few milliseconds. To create pseudo synchronization, node N1 after ranging to node N2 sends a TTAG (control) to N2, with, for example, an Ethertype field that indicates that this is a "synchronization" control frame. N1 tells N2 in this frame the RTT/2 value between itself and N2 as well as the time of sending the frame (its local time). N2 can now compute the time at N1 by adding the RTT/2 value to the local time sent by N1. In this way pseudo synchronization between the nodes can be achieved. Note that the synchronization is not tightly coupled as the transmission depends on queueing delay at the two nodes (e.g., output queueing at node N1 and input queueing at node N2 for packets sent from N1 to N2). The downstream nodes of a root now proliferates the timestamp and weight information, till every node within the AS has been pseudo synchronized with respect to the root as well as every edge has been labeled with a weight.

Some embodiments can determine a tree as follows. We represent the local access node (or the root node) of the AS by Ni. Every node Nj calculates the weight w_jk for all its adjacent nodes by using the mechanism described above. However, note that Nj does not know the weights of nodes other than its neighbors. To enable the discovery of a minimum binary spanning tree, we define the following two message types (TTAG). The first message type is a discover message which communicates two parameters, w and N, where N is the S-ARTAG of the node sending the message and w is the weight or distance metric. For instance, Nj sends a discover message (w_jk, Nj) to Nk to inform Nk that there is a path of weight w_jk from Ni to Nk via Nj. The second message type is an acknowledgment message (or ack) that is sent by a node Nk to a node Nj in response to a discover message sent by Nj. An ack denotes that the weight metric sent by Nj to Nk is accepted as the shortest path and has been forwarded to all the nodes reachable from Nk.

Apart from these two message types, each node can maintain the following local variables. (1) wmin=The minimum weight (or distance) from Ni to Nj known to this node. Note that wmin=∞ if the node has not received a discover message. wmin=0 for root node Ni. (2) pred=The upstream node from which the weight wmin was received. This is the last node encountered in shortest path to Nj computed so far. Note that pred is undefined if wmin=∞ or if Nj=Ni. (3) rem_ack=the number of discover messages sent by this node for which no ack has been received so far.

Based on the above message types and local variables, each node except the root node (Ni) can perform the following distributed process (illustrated using pseudo-code).

```
// Node Initialization
wmin = ∞
pred = undefined
rem_ack = 0
Whenever a discover message (w_jk , Nj) is received,
do the following {
    // Was a new shortest path found?
    if (w_jk < wmin) {
    // Yes, a new shortest path was found
    // Send an ack to the upstream node on the
    previous
    // shortest path
        If (rem_ack > 0), send a ack to pred;
        pred = Nj;
        wmin = wjk;
        send a discover message (wmin + w_kj') to
        every successor Nj' of Nk;
        rem_ack = rem_ack + number of successors of
    Nk;
        if rem_ack = 0, then send an ack to pred;
    } // end of if
    else if (w_jk >= wmin) {
    // No, a new shortest path was not found.
    Send ack to Nj;
    } // end of else
} // end of discover message processing
Whenever an ack message is received from node Nj', do
the following {
    rem_ack = rem_ack – 1;
    if rem_ack = 0 then send ack to pred;
} // end of ack message processing
```

Communication between two or more hosts can occur as follows. Let us assume that node Na in AS "i" is coupled to a source host. Further, let us assume that the source host desires to communicate with a destination host. We first check if the destination is in a table that stores mappings between destination hosts (e.g., based on the MAC, IP, and/or URL associated with the destination hosts) and ARTAGs. In some embodiments, this information can be stored in the above-described TELL table. If the destination mapping is found in the table, then the appropriate set of bits (e.g., the destination ARTAG) can be added to the packet, and the packet can be routed based on the set of bits.

If however, the destination is not in the table, then the source host can send a translate request (e.g., a TTAG with type="translate") to the nearest ENS server. As mentioned before, the ENS server can maintain a mapping between the MAC, IP, and/or URL addresses and S-ARTAGs. The translated request can contain the IP/MAC/URL address of the destination. If the ENS server has the mapping to the destination, then the ENS server can respond back with the response frame sending both the MAC/IP/URL and the corresponding ARTAG to the source node.

If however, no ENS in the AS has this mapping, then the translated frame can be routed to the root (the local access node for the AS). The root can then send the request for this mapping to other ENSs in the network (in other ASs). The AS that contains the destination can then respond back with the appropriate mapping. The local access node of the AS that contains the source node can now receive this mapping and send it to the source node.

Since the destination is outside the AS of the source node, the source node sends two pieces of information with every data frame to the destination. The first piece of information is its own S-ARTAG as the route tag, since the packet has to go to the root, and it also sends the AS unique number, that tells the root node which AS exactly to route this packet to. In this way inter-domain communication can occur for a source node to communicate with a destination node.

Figure 11:
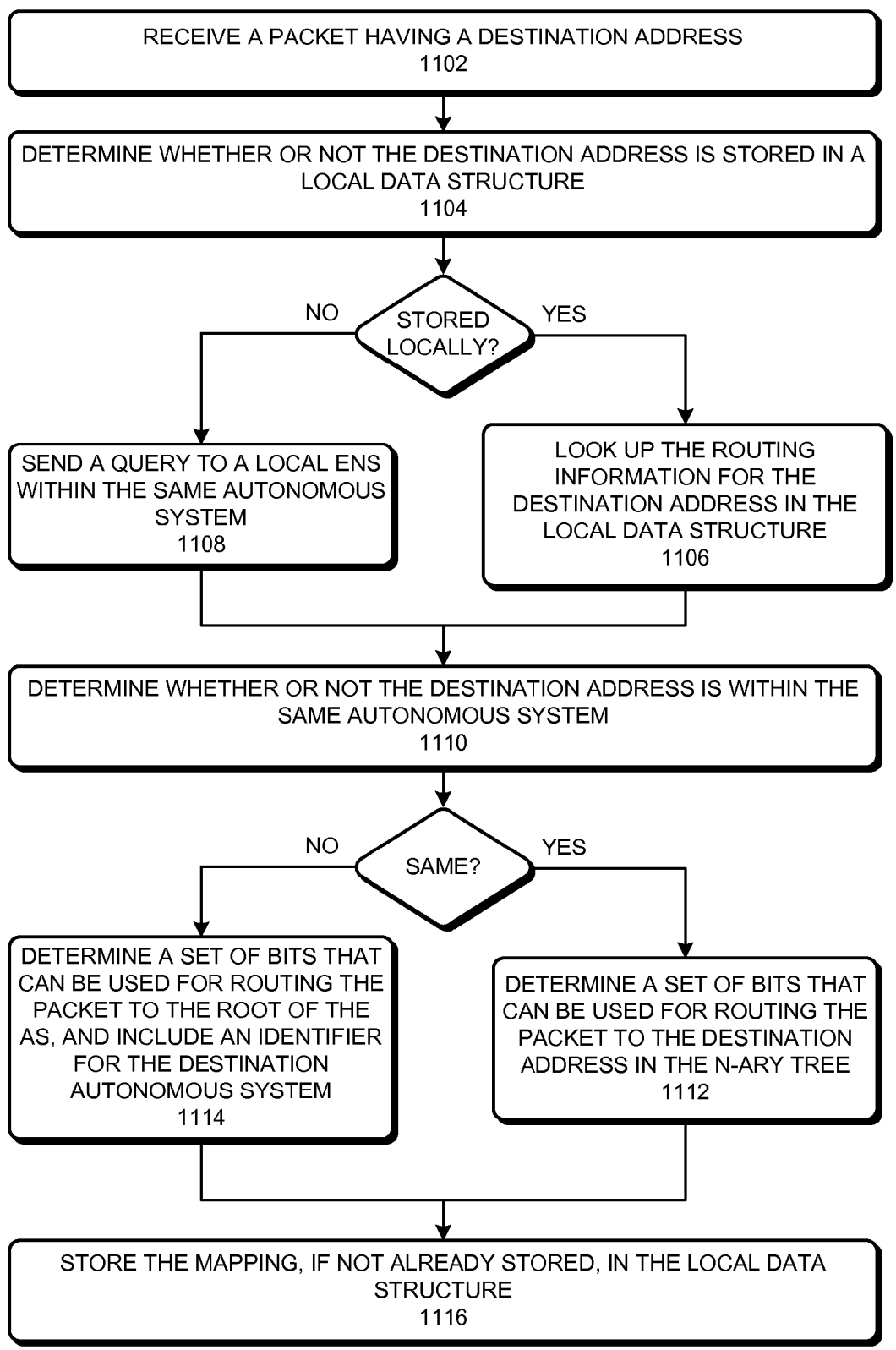
FIG. 11 presents a flowchart that illustrates a process for determining a set of bits (e.g., an ARTAG) that can be used for routing a packet in an n-ary tree in accordance with some embodiments described in this disclosure.

FIG. 11 presents a flowchart that illustrates a process for determining a set of bits (e.g., an ARTAG) that can be used for routing a packet in an n-ary tree in accordance with some embodiments described in this disclosure. The following process can be used by the source host. If the source host is not capable of determining an ARTAG, then node Na may perform the following process.

The process can begin by a system (e.g., a source host or a switch-router coupled to the source host) receiving a packet having a destination address (operation 1102). As described above, the destination address can be a MAC address, an IP address, and/or a URL.

Next, the system can determine whether or not the destination address is stored in a local data structure (operation 1104). If the destination address is stored in the local data structure, the system can look up the routing information for the destination address in the local data structure (operation 1106). On the other hand, if the destination address is not stored in the local data structure, the system can send a query to a local ENS within the same AS (operation 1108). The local ENS can send a query to a remote ENS if a mapping for the destination address is not stored on the local ENS.

Once the mapping for the destination address is obtained, the system can determine whether or not the destination address is within the same AS (operation 1110). If the destination is within the same AS, the system can determine a set of bits (e.g., an R-ARTAG) that can be used for routing the packet to the destination address in the n-ary tree (operation 1112). On the other hand, if the destination is not within the same AS, the system can determine a set of bits that can be used for routing the packet to the root of the AS, and include an identifier for the destination AS (operation 1114). The system can then store the mapping, if not already stored, in the local data structure (operation 1116).

The inter-domain communication example can be applied to other scenarios such as metro transport. In this case, assume a graph G(V,E), and assume traffic to enter the network at any edge v in V. At an ingress node, the incoming data-stream could be a client service that is not capable of performing communications using an n-ary-tree and source-routing based communication architecture. For example, the client service may be capable of handling only Ethernet frames with CTAGs/STAGs, just pure Ethernet frames, IPv4 packets and/or IPv6 packets. In such situations, the header information in the incoming packets may be mapped into a set of bits that can be used for routing the packet in an n-ary-tree and source-routing based network. For example, this mapping can be performed by using a local data structure (e.g., a TELL table) or by using an ENS.

Note that S-ARTAG calculation can be performed using an appropriate approach. In one approach is to determine the S-ARTAG as per n-ary or binary routing. The second approach uses the inter-domain communication mechanism as described above. In the following discussion, this second approach for computation of S-ARTAGs is referred to as binary injected routing. While the routing is based on the binary string pertaining to the node, the actual calculation of the string can be done taking shortest path routing into consideration. In one embodiment, the shortest path can be computed using Dijkstra's shortest path technique or any other shortest path technique, while in another embodiment the procedure explained below can be used for such path computation.

In some embodiments, to perform the shortest path computation, the binary string can be computed by mapping the physical shortest path into an array of the nodes from the source to the destination and then replacing the constituent nodes with binary nodes. Subsequent to this replacement, the binary nodes in the array can again be replaced by binary variables, which when observed collectively indicate the path from the source to the destination.

For example, if the shortest path from the source to the destination consists of nodes A, B, C and D, then the first array can be defined by the set {A, B, C, D}. Each element in this array can be replaced by its binary node structure—a node in the array may have multiple binary nodes depending on the degree of connectivity of the node. Thus, the set now becomes {bA1, bA2, bA3, bB, bC1, bC2, bD}. Each element in this set is further replaced by the binary variable—for each element thus depicting the path from the source to the destination: {0100110}. This is the R-ARTAG that needs to be used for any traffic that wants to go from A to D. This R-ARTAG mapping can then be stored in the TELL table. Any traffic that arrives at A with a desire to go to D, (either with the MAC/CTAG/STAG or ISID or IPv4/6 address pointing towards D), can then be encapsulated in a frame with the corresponding R-ARTAG. This procedure of using binary routing embedded over shortest path routing is called as binary injected routing.

Some embodiments described in this disclosure use binary injected routing to solve the problem of end-to-end communication in an n-ary-tree and source-routing based communication architecture. In some embodiments, the n-ary-tree and source-routing based communication architecture framework assumes the creation of an n-ary or binary tree embedded over a physical graph.

From a network connectivity perspective, two observations of this approach are as follows: (1) links in the graph that are not part of the binary tree are never utilized for traffic; and (2) nodes do not always use the shortest path for communication. The result of these two observations is that the network may not be optimally utilized and it is hence difficult to accommodate traffic that could otherwise be carried on the network. Another feature that may not be easily supported by this approach is the provisioning of traffic across multiple paths. Popularly known as ECMP or Equal Cost Multiple Path, it is difficult to spread or load-balance traffic across a network in this approach.

Some embodiments overcome these issues by using a universal addressing scheme that takes advantage of n-ary and source routing while facilitating optimal resource utilization.

This scheme is herein called the Binary Injected Routing or BIR, and it allows the network to be configured in a way that, despite the use of n-ary and source routing, the path followed from a source-to-a-destination is necessarily always the shortest path. An advantage of this approach is that it results in the maximum possible network-wide utilization. A scheme such as equal cost multiple costs can also be setup as an overlay over such a network.

The examples shown below apply BIR to the shortest path. However, in general, BIR is applicable to any preselected path, which may or may not be the shortest path.

To understand how BIR works, consider a graph G(V,E) as the input network graph, where V is the set of vertices (nodes) and E the set of edges. First, we define $G_S(V,E_S)$: $P_{sd}^S(\forall s, d \in V) \in G_S(V,E_S)$, whereby $P_{sd}^S$ is the shortest path from the source-to-the-destination. Next, we define over the graph $G_S$ a root node, with the following attributes:

$$\text{Node } V_R: \frac{1}{|V|}\sum l(V_R - V_A) < \frac{1}{|V|}\sum l(V_B - V_A) \forall\ V_B \in V.$$

Now, we consider the graph $G_S$ and we note that for $G_S$ to include all the shortest paths, it implies that $G_S$ will likely contain cycles. We thus disconnect the cycles in $G_S$ using the following rule: disconnect $\{\bar{e}_s\} \in E_S$, such that, $\{\bar{e}_s\}$ is a minimum set (i.e., no other set has lesser number of edges than set $\{\bar{e}_s\}$).

We denote this by: $G_S^T(V,E_{S-\{\bar{e}_s\}}) = G_S(V,E_S) - \{\bar{e}_s\}$ as a tree. The tree $G_S^T(V,E_{S-\{\bar{e}_s\}})$ is called the generator tree. Next, we convert the generator tree $G_S^T(V,E_{S-\{\bar{e}_s\}})$ to a binary tree. We define the operator $\stackrel{bin}{\rightarrow}$ as the function that when applied to a graph, converts every node whose degree of connectivity is greater than 1×2 to a cluster of nodes, each of whose degree of connectivity is either 1×2 or 1×2, i.e. are all binary nodes. Thus, $G_S^T(V,E_{S-\{\bar{e}_s\}}) \stackrel{bin}{\rightarrow}$ $$G_S^{TB}(V_B, \overline{E_{S-\{\bar{e}_s\}}}).$$

Note that, the set of edges in $$G_S^{TB}(V_B, \overline{E_{S-\{\bar{e}_s\}}})$$

are different from the set of edges in $G_S^T(V,E_{S-\{\bar{e}_s\}})$, due to insertion of virtual binary nodes. The set, denoted by $E_{S-\{\bar{e}_s\}}$, is called the binary edge generator.

Next, for every edge that we disconnected from the graph $G_S(V,E_S)$, and in the set $\{\bar{e}_s\}$, we note the disconnection points in the graph $$G_S^{TB}(V_B, \overline{E_{S-\{\bar{e}_s\}}})$$

as nodes in the set $V_B$ and denote these as: $V_B^{\{\bar{e}_s\}}$. The binary nodes in $V_B^{\{\bar{e}_s\}}$ subtend the edges that were disconnected ($\{\bar{e}_s\}$).

We now add more virtual nodes to the set $V_B^{\{\bar{e}_s\}}$ such that adding the edges in $\{\bar{e}_s\}$ would be possible. We denote this graph (with the new nodes that can support edges in $\{\bar{e}_s\}$) as the binary injected graph (BIG) as:

$$G_S^{TB}(V_{B+\{\bar{e}_s\}}, \overline{E_{S-\{\bar{e}_s\}}}).$$

Note that we have added the edges in $\{\bar{e}_s\}$ to $$G_S^{TB}(V_B, \overline{E_{S-\{\bar{e}_s\}}})$$

leading to the BIG. For every node $$v \in G_S^{TB}(V_{B+\{\bar{e}_s\}}, \overline{E_{S-\{\bar{e}_s\}}}),$$

we assign a binary address, giving the address of 0 to the root. Now, for every source destination pair we can use the shortest path embedded over the physical graph while enabling binary routing from the source to the destination.

Figure 12:
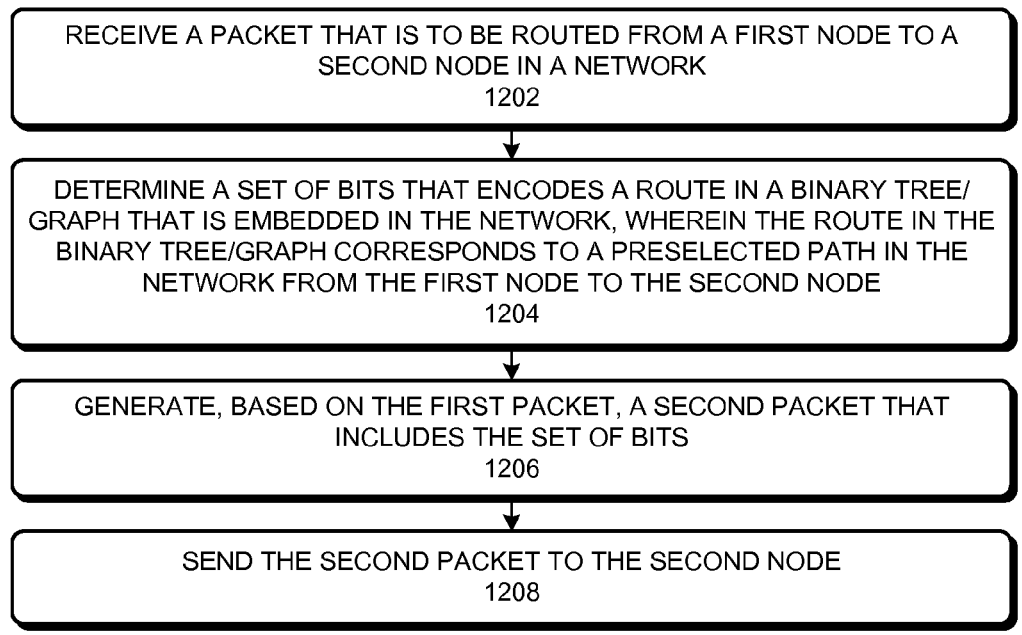
FIG. 12 presents a flowchart that illustrates a process for generating a packet for binary injected routing in accordance with some embodiments described in this disclosure.

FIG. 12 presents a flowchart that illustrates a process for generating a packet for binary injected routing in accordance with some embodiments described in this disclosure.

The process can begin by a system receiving a packet that is to be routed from a first node to a second node in a network (operation 1202). Next, the system can determine a set of bits that encodes a route in a binary tree/graph that is embedded in the network, wherein the route in the binary tree/graph corresponds to a preselected path in the network from the first node to the second node (operation 1204). In some embodiments, the preselected path is a shortest path from the first node to the second node. The system can then generate, based on the first packet, a second packet that includes the set of bits (operation 1206). Next, the system can send the second packet to the second node (operation 1208). The network can then use the set of bits to route the second packet from the first node to the second node over the embedded binary tree/graph.

Figure 13:
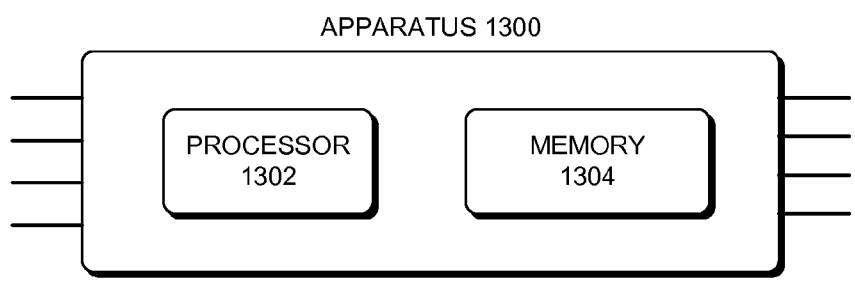
FIG. 13 illustrates an apparatus in accordance with some embodiments described in this disclosure.

FIG. 13 illustrates an apparatus in accordance with some embodiments described in this disclosure.

Apparatus 1300 can include one or more processors and one or more non-transitory processor-readable storage media. Specifically, apparatus 1300 can include processor 1302 (e.g., a network processor) and memory 1304. Apparatus 1300 can also include one or more packet buffers, e.g., a fast packet buffer (e.g., a memory with a relatively low latency) and a slow packet buffer (e.g., a memory with a relatively high latency). Processor 1302 may be capable of accessing and executing instructions stored in memory 1304. For example, processor 1302 and memory 1304 may be coupled by a bus. Memory 1304 may store instructions that when executed by processor 1302 cause apparatus 1300 to perform any of the processes that have been implicitly or explicitly described in this disclosure. Specifically, memory 1304 may store instructions required for performing inter-domain routing in an n-ary-tree and source-routing based communication architecture.

Figure 14:
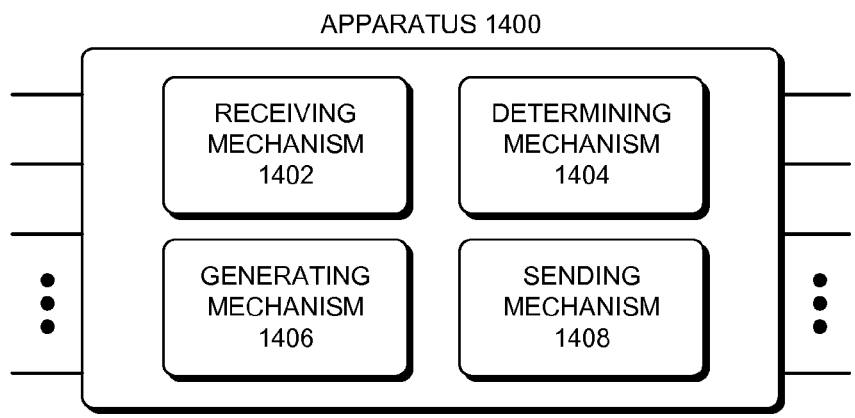
FIG. 14 illustrates an apparatus in accordance with some embodiments described in this disclosure.

FIG. 14 illustrates an apparatus in accordance with some embodiments described in this disclosure.

Apparatus 1400 can include a plurality of mechanisms which may communicate with one another via a communication channel, e.g., a bus. One or more mechanisms in apparatus 1400 may be realized using one or more field-programmable gate arrays (FPGAs) or application-specific integrated circuits (ASICs).

Specifically, in some embodiments, apparatus 1400 can include receiving mechanism 1402, determining mechanism 1404, generating mechanism 1406, and sending mechanism 1408.

In some embodiments, receiving mechanism 1402 can be configured to receive a first packet that is to be routed from a first node in a first AS to a second node in a second AS. Determining mechanism 1404 can be configured to determine a set of bits that encodes a route in an n-ary tree that includes the first node and a root node in the first AS. Generating mechanism 1406 can be configured to generate, based on the first packet, a second packet that includes the set of bits and an identifier associated with the second AS. Sending mechanism can be configured to send the second packet to the root node in the first AS.

In some embodiments, receiving mechanism 1402 can be configured to receive a first packet that is to be routed from a first node to a second node in a network. Determining mechanism 1404 can be configured to determine a set of bits that encodes a route in a binary tree/graph that is embedded in the network, wherein the route in the binary tree/graph corresponds to a preselected path in the network from the first node to the second node. Generating mechanism 1406 can be configured to generate, based on the first packet, a second packet that includes the set of bits. Sending mechanism can be configured to send the second packet to the second node.

The data structures and code described in this disclosure can be partially or fully stored on a non-transitory computer-readable storage medium and/or a hardware mechanism and/or a hardware apparatus. A computer-readable storage medium includes, but is not limited to, volatile memory, non-volatile memory, magnetic and optical storage devices such as disk drives, magnetic tape, CDs (compact discs), DVDs (digital versatile discs or digital video discs), or other non-transitory media, now known or later developed, that are capable of storing code and/or data.

Embodiments described in this disclosure can be implemented in ASICs, FPGAs, dedicated or shared processors, and/or other hardware modules or apparatuses now known or later developed. Specifically, the methods and/or processes may be described in a hardware description language (HDL) which may be compiled to synthesize register transfer logic (RTL) circuitry which can perform the methods and/or processes. Embodiments described in this disclosure may be implemented using purely optical technologies. The methods and processes described in this disclosure can be partially or fully embodied as code and/or data stored in a computer-readable storage medium or device, so that when a computer system reads and/or executes the code and/or data, the computer system performs the associated methods and processes.

The foregoing descriptions of embodiments of the present invention have been presented only for purposes of illustration and description. They are not intended to be exhaustive or to limit the present invention to the forms disclosed. Accordingly, many modifications and variations will be apparent to practitioners having ordinary skill in the art. Additionally, the above disclosure is not intended to limit the present invention. The scope of the present invention is defined by the appended claims.

What is claimed is:

1. An apparatus, comprising:
a receiving mechanism configured to receive a first packet that is to be routed from a first node in a first Autonomous System (AS) to a second node in a second AS;
a determining mechanism configured to determine a set of bits that encodes a route in an n-ary tree that includes the first node and a root node in the first AS, wherein each node in the route corresponds to a subset of the set of bits that identifies an outgoing edge of the node over which the first packet is to be routed;
a generating mechanism configured to generate, based on the first packet, a second packet that includes the set of bits and an identifier associated with the second AS, wherein the second packet is an Ethernet packet, and wherein the set of bits are stored in one or more VLAN (Virtual Local Area Network) tags; and
a sending mechanism configured to send the second packet to the root node in the first AS.

2. The apparatus of claim 1, wherein the route in the n-ary tree corresponds to a shortest path in the n-ary tree from the first node to the root node in the first AS.

3. The apparatus of claim 1, wherein the second packet causes the root node in the first AS to generate a third packet based on the second packet, and send the third packet to a root node in the second AS.

4. The apparatus of claim 3, wherein the third packet causes the root node in the second AS to generate a fourth packet based on the third packet, and send the fourth packet to the second node in the second AS.

5. A method, comprising:
receiving a first packet that is to be routed from a first node to a second node in a network;
determining a set of bits that encodes a route in a binary tree/graph that is embedded in the network, wherein the route in the binary tree/graph corresponds to a preselected path in the network from the first node to the second node, wherein each node in the route corresponds to a subset of the set of bits that identifies an outgoing edge of the node over which the first packet is to be routed;
generating, based on the first packet, a second packet that includes the set of bits, wherein the second packet is an Ethernet packet, and wherein the set of bits are stored in one or more VLAN (Virtual Local Area Network) tags; and
sending the second packet to the second node.

6. The method of claim 5, wherein the preselected path is a shortest path from the first node to the second node.

7. An apparatus, comprising:
a receiving mechanism configured to receive a first packet that is to be routed from a first node in a first Autonomous System (AS) to a second node in a second AS;
a determining mechanism configured to determine a set of bits that encodes a route in an n-ary tree that includes the first node and a root node in the first AS, wherein each node in the route corresponds to a subset of the set of bits that identifies an outgoing edge of the node over which the first packet is to be routed;
a generating mechanism configured to generate, based on the first packet, a second packet that includes the set of bits and an identifier associated with the second AS, wherein the second packet is an MPLS (Multi-Protocol Label Switching) packet, and wherein the set of bits are stored in one or more MPLS labels; and
a sending mechanism configured to send the second packet to the root node in the first AS.

8. The apparatus of claim 7, wherein the route in the n-ary tree corresponds to a shortest path in the n-ary tree from the first node to the root node in the first AS.

9. The apparatus of claim 7, wherein the second packet causes the root node in the first AS to generate a third packet based on the second packet, and send the third packet to a root node in the second AS.

10. The apparatus of claim 9, wherein the third packet causes the root node in the second AS to generate a fourth packet based on the third packet, and send the fourth packet to the second node in the second AS.

11. A method, comprising:
   receiving a first packet that is to be routed from a first node to a second node in a network;
   determining a set of bits that encodes a route in a binary tree/graph that is embedded in the network, wherein the route in the binary tree/graph corresponds to a preselected path in the network from the first node to the second node, wherein each node in the route corresponds to a subset of the set of bits that identifies an outgoing edge of the node over which the first packet is to be routed;
   generating, based on the first packet, a second packet that includes the set of bits, wherein the second packet is an MPLS (Multi-Protocol Label Switching) packet, and wherein the set of bits are stored in one or more MPLS labels; and
   sending the second packet to the second node.

12. The method of claim 11, wherein the preselected path is a shortest path from the first node to the second node.

\* \* \* \* \*